(12) United States Patent
Kawase

(10) Patent No.: US 11,315,375 B2
(45) Date of Patent: Apr. 26, 2022

(54) FACIAL AUTHENTICATION SYSTEM, APPARATUS, METHOD AND PROGRAM

(71) Applicant: NEC CORPORATION, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/498,788

(22) PCT Filed: Mar. 30, 2018

(86) PCT No.: PCT/JP2018/013797
§ 371 (c)(1),
(2) Date: Sep. 27, 2019

(87) PCT Pub. No.: WO2018/181968
PCT Pub. Date: Oct. 4, 2018

(65) Prior Publication Data
US 2021/0110625 A1    Apr. 15, 2021

(30) Foreign Application Priority Data
Mar. 31, 2017 (JP) .............................. JP2017-073042

(51) Int. Cl.
*G07C 9/25* (2020.01)
*G06K 9/00* (2022.01)

(52) U.S. Cl.
CPC ......... *G07C 9/257* (2020.01); *G06K 9/00255* (2013.01); *G06K 9/00288* (2013.01); *G07C 9/25* (2020.01)

(58) Field of Classification Search
CPC ..................... G06K 9/00268; G06K 9/00221; G06F 21/32; G06F 16/50; G07C 9/37; G07C 9/00; G07C 9/25; G07C 9/253; G06T 7/00
See application file for complete search history.

(56) References Cited

U.S. PATENT DOCUMENTS

| 5,414,249 A | * | 5/1995 | Matsumoto | .............. | G07C 9/10 235/384 |
| 8,208,028 B2 | | 6/2012 | Yamazaki | | |

(Continued)

FOREIGN PATENT DOCUMENTS

| JP | 06-36096 A | 2/1994 |
| JP | 11-120304 A | 4/1999 |

(Continued)

OTHER PUBLICATIONS

International Search Report for PCT/JP2018/013797, dated Jul. 3, 2018.

(Continued)

*Primary Examiner* — Benyam Haile
(74) *Attorney, Agent, or Firm* — Sughrue Mion, PLLC

(57) ABSTRACT

There are provided a reader that receives one or more identifiers transmitted by one or more wireless tags of one or more users entering a wireless area located outside one end of a longitudinal direction of a gate; an acquisition part that acquires a facial feature value registered in association with each identifier received from each wireless tag; an imaging part that captures image of the user; an extraction part that extracts a facial feature value from image data generated by the imaging part; and a face collation part that receives the facial feature value extracted by the extraction part and checks whether or not the facial feature value match one or more facial feature values acquired by the acquisition part.

20 Claims, 30 Drawing Sheets

(56) References Cited

U.S. PATENT DOCUMENTS

| | | | |
|---|---|---|---|
| 2004/0151347 A1* | 8/2004 | Wisniewski | G06K 9/00275 |
| | | | 382/115 |
| 2009/0189984 A1 | 7/2009 | Yamazaki | |
| 2011/0316881 A1* | 12/2011 | Yoshifuji | H04N 13/31 |
| | | | 345/634 |
| 2014/0015978 A1 | 1/2014 | Smith | |
| 2015/0310201 A1* | 10/2015 | Sugiyama | G06F 21/552 |
| | | | 726/7 |
| 2017/0053435 A1* | 2/2017 | Reymann | H04N 7/183 |

FOREIGN PATENT DOCUMENTS

| | | |
|---|---|---|
| JP | 2000-220333 A | 8/2000 |
| JP | 2000-222534 A | 8/2000 |
| JP | 2003-331323 A | 11/2003 |
| JP | 2006-072862 A | 3/2006 |
| JP | 2008-40781 A | 2/2008 |
| JP | 2008-052549 A | 3/2008 |
| JP | 2010-097272 A | 4/2010 |
| JP | 2011-18300 A | 1/2011 |
| JP | 2013-061875 A | 4/2013 |
| JP | 2016-170517 A | 9/2016 |
| JP | 2017-059060 A | 3/2017 |

OTHER PUBLICATIONS

Communication dated Jul. 28, 2020, from the Japanese Patent Office in Application No. 2019-509398.
Japanese Office Action for JP Application No. 2020-214895 dated Mar. 1, 2022 with English Translation.

\* cited by examiner

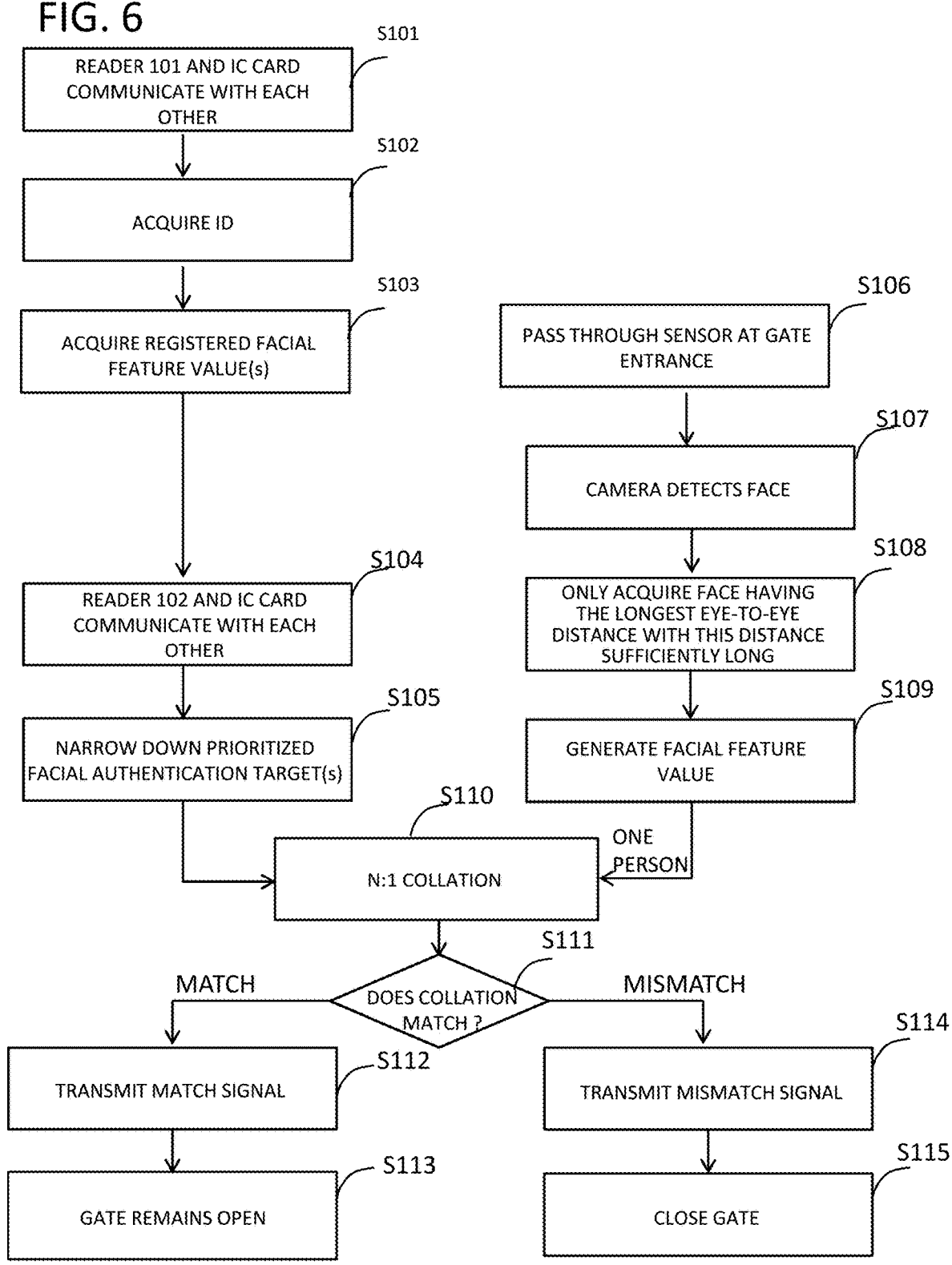

FIG. 9B

|  | READER 101 | READER 102 | DIRECTION | STATUS |
|---|---|---|---|---|
| USER A | O | O | LEFT→RIGHT | -DB SEARCHED<br>-PRIORITIZED AUTHENTICATION |
| USER B | O | × | LEFT → RIGHT | -DB SEARCHED |
| USER C | × | O | LEFT ← RIGHT | -DB SEARCHED |

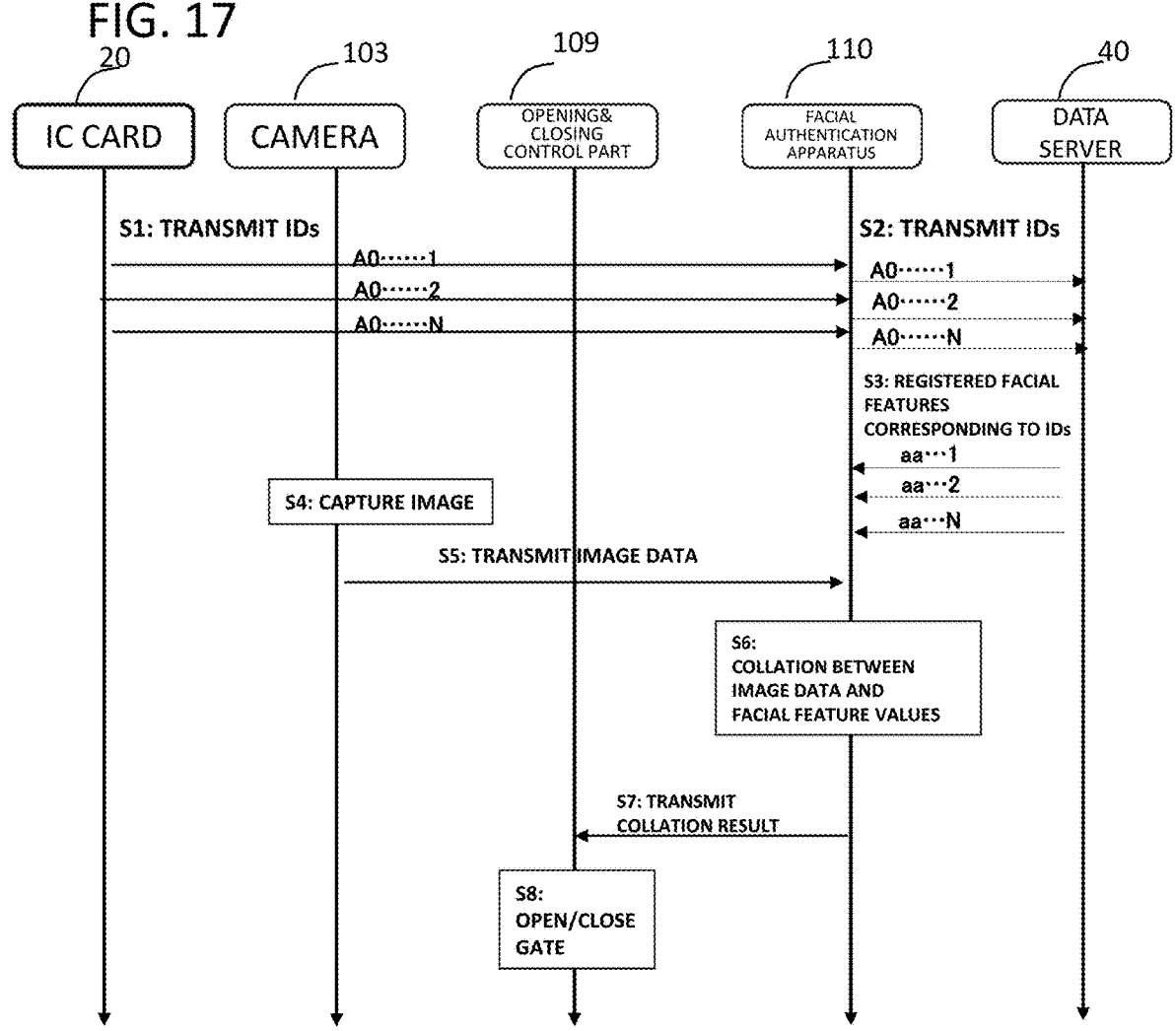

FIG. 18A
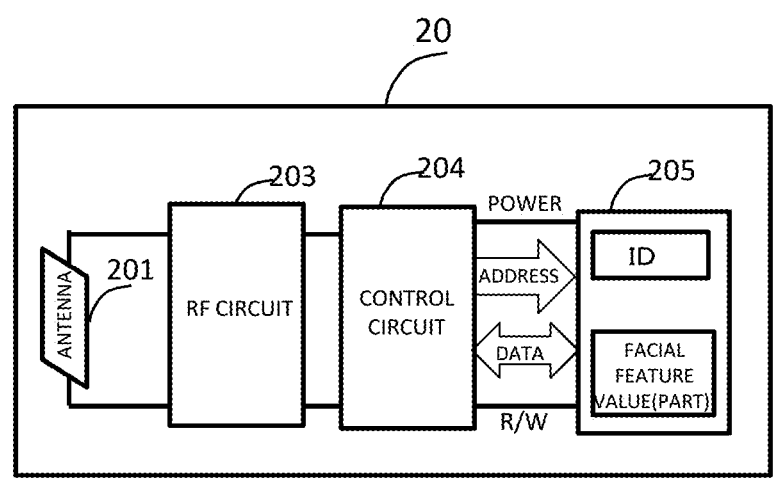
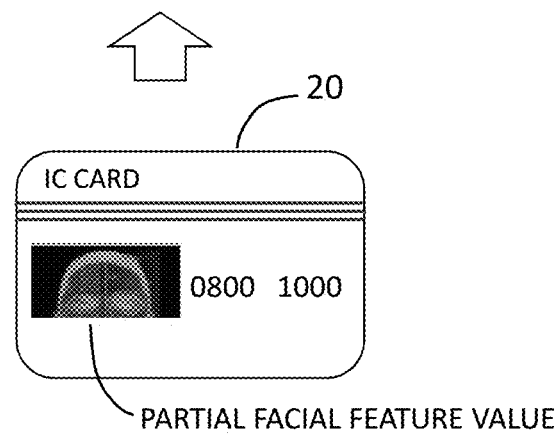
PARTIAL FACIAL FEATURE VALUE

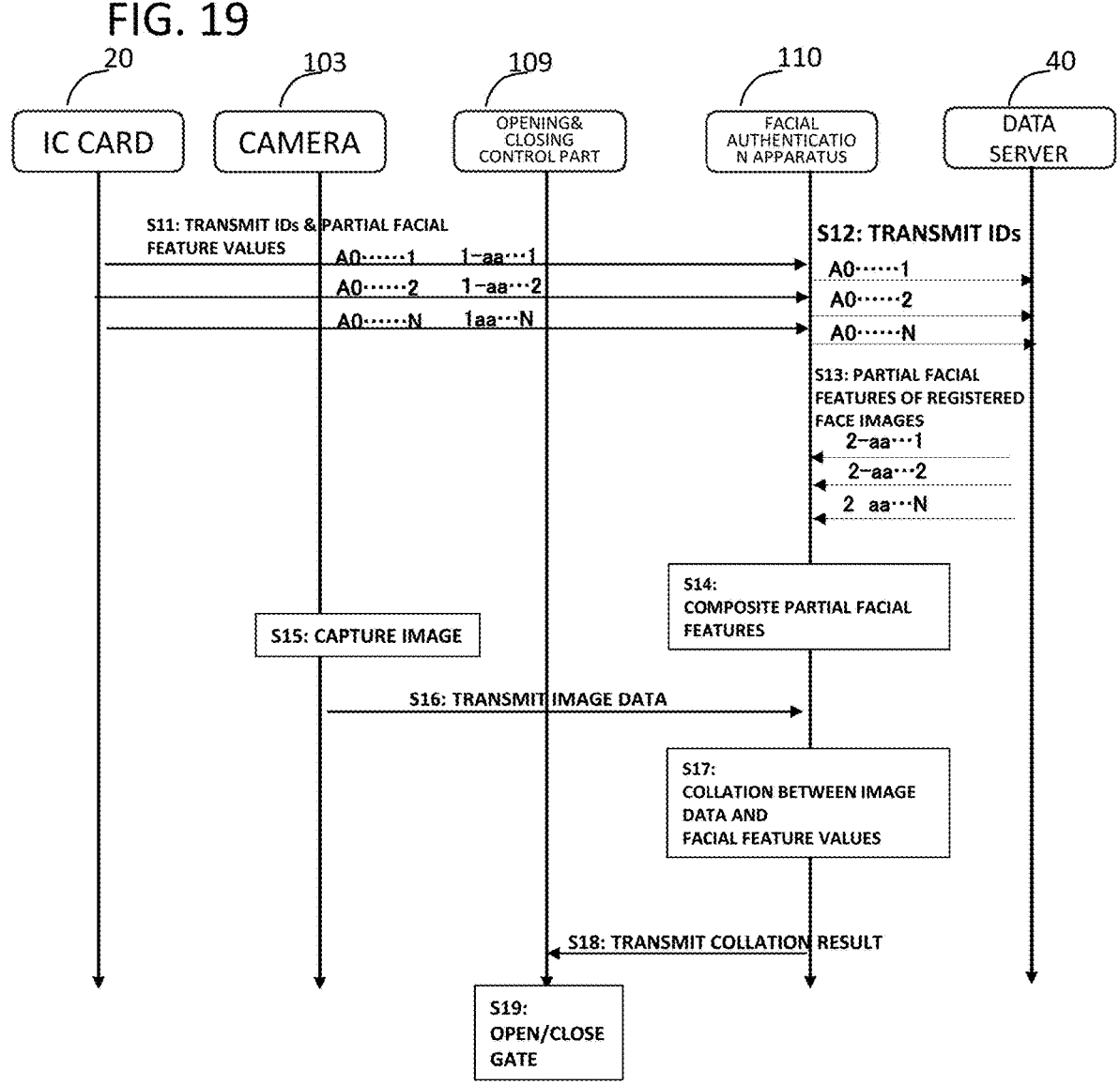

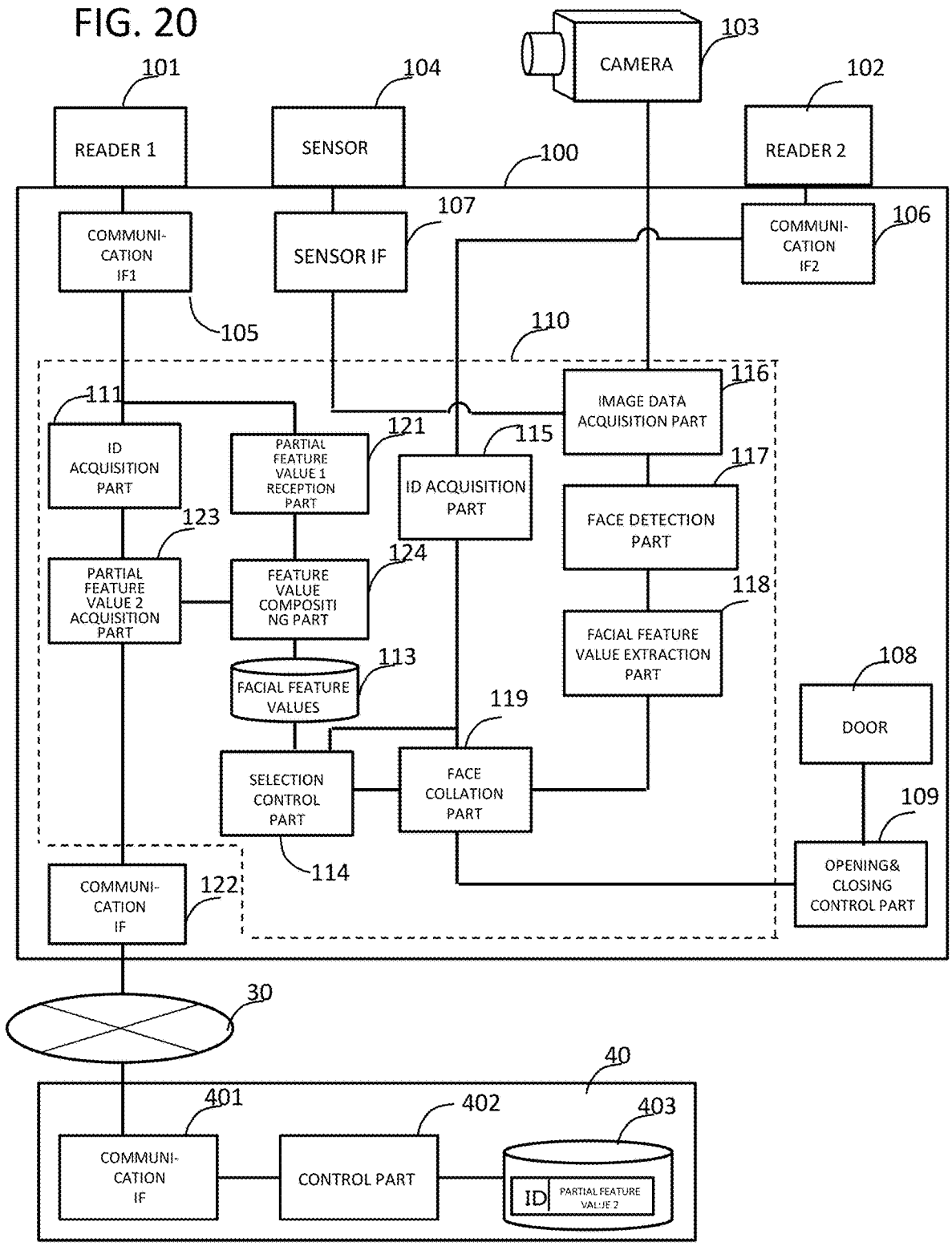

FIG. 21
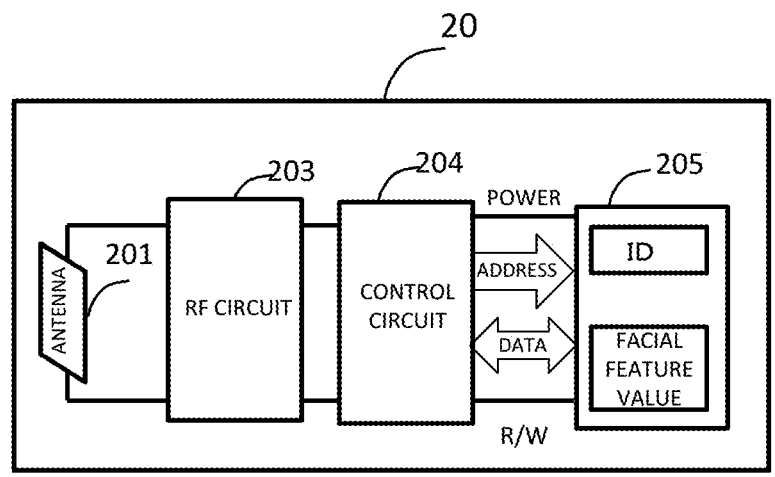
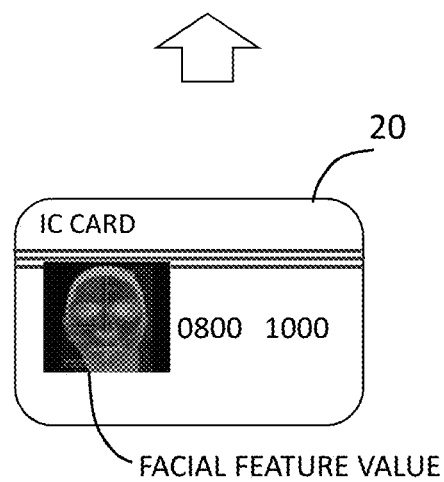

FACIAL AUTHENTICATION SYSTEM, APPARATUS, METHOD AND PROGRAM

REFERENCE TO RELATED APPLICATION

This application is a National Stage of International Application No. PCT/JP2018/013797 filed Mar. 30, 2018, claiming priority based on f Japanese patent application No. 2017-073042 filed on Mar. 31, 2017, the disclosure of which is incorporated herein in its entirety by reference thereto.

FIELD

The present invention relates to a facial authentication system, apparatus, method and program.

BACKGROUND

In recent years, in a situation where personal identification is performed, biometrics authentication in which authentication is performed using biometric information, i.e., information on physical characteristics and behavioral characteristics of human beings, has been utilized. For instance, facial authentication, a type of biometrics authentication has the following benefits:

A person targeted for authentication feels less uncomfortable psychologically.

Remote authentication is possible.

A psychological deterrent effect against fraudulent activities.

The facial authentication technology is used for identification in various fields, and its application range is expanding.

There is a system that performs open/close control using facial authentication. In such a system, A camera captures a face of a target person, Facial features are extracted from a captured image using an image recognition technology, The extracted facial features are compared with a facial feature database prepared in advance, A door is opened or locked depending on whether or not the extracted facial features match those in the database. FIG. 1 is a diagram illustrating a typical example of an automatic door using a facial authentication technology. Face data (facial feature values) of a user 11 is registered in a database (DataBase: DB) 15 in advance. The user 11 stands in front of a camera 13 arranged at a side of a door 12. The door 12 is normally locked. A facial authentication apparatus 14 performs facial authentication by extracting facial feature values from image data (face image) of the user 11 captured by the camera 13 and comparing the extracted facial feature value with the face data (feature values) registered in the database 15. A opening and closing control apparatus 16 opens or closes the door 12 based on the authentication results of the facial authentication apparatus 14. The opening and closing control apparatus 16 outputs a signal for opening the lock of the door 12 only for the user 11 who has passed the facial authentication. The door 12 remains locked for a user who does not pass facial authentication. As a result, it is possible to prevent a suspicious person or anybody other than registered users from entering.

As stated in Patent Literature 1, a facial authentication entry and exit management system has a problem as follows.

The more the number of people registered in the feature value database, the higher the probability that people with similar feature values exist in the database, The more the number of people with similar feature values, the more likely that an erroneous recognition occurs, and As a result, an accuracy rate in the authentication decreases.

The Patent Literature 1 discloses the following configuration to solve this problem. A wireless terminal apparatus (wireless tag: for instance passive RFID (Radio Frequency Identifier) tag) owned by an authentication target (person) in front of a door wirelessly transmits identification information and wireless communication means receives the identification information. Image acquisition means acquires an image of the authentication target and feature value acquisition means acquires feature values. Storage means stores feature values and feature value determination information while having these items of information associated with the identification information of a plurality of targets. When the feature value determination information defining a determination method different from a standard determination method is stored in association with the received identification information, authentication means collates the feature values stored in association with the identification information with the acquired feature values by using the feature value determination information to authenticate the authentication target.

Patent Literature 2 discloses a biometrics collation system in which, if a user has a portable terminal, it is not necessary to enter an ID (Identification) code or present a magnetic card, thereby enhancing convenience for users. The biometrics collation system includes a plurality of portable terminals and a biometrics collation apparatus, which includes a storage apparatus, an acquisition part, a reception part, an extraction part, and a collation part. The storage apparatus stores a registered biometrics image of a user of each portable terminal in association with identification information of each portable terminal. The acquisition part acquires input biometrics information of a specific user. The reception part receives a location signal or wireless signal from each portable terminal. The extraction part detects two or more portable terminals within a predetermined range from the biometrics collation apparatus based on the received location signal or wireless signal, and extracts two or more registered biometrics images each associated with the identification information of the detected portable terminal from the registered biometrics images stored in the storage apparatus. The collation part collates each piece of the input biometrics information with the extracted registered biometrics images.

As a system that opens/closes a door using facial authentication and a card, Patent Literature 3 discloses a face image search system that captures a face image of a target and calculates a similarity between the captured face image and a face image extracted from a database where face images of targets are stored. In this face image search system, a card reader reads a card ID given to and stored in a storage medium such as a magnetic card, IC (Integrated Circuit) card, or wireless tag, etc., owned by a target, the card ID read is searched as a key in the database, and a face image associated with the card ID is acquired.

The summary of the related technologies is as follows.

They are intended for the opening and closing of a door, and the applicable area is basically a closed area (small to medium sized room).

Further, the number of registered pieces of face data of authenticated users is also small to medium.

Facial authentication and the opening/closing of the door is performed for one person at a time.

The user has to look into an authentication area, for instance a fixed frame (for instance 13 in FIG. 1).

No particular high authentication speed is required.

Entrance/exit has only one path.

The door is usually closed and it opens upon successful authentication.

Authentication is basically one-way only, for instance, when a user enters a room from outside.

Such facial authentication cannot be applied to a walk-through gate through which a user can pass without stopping.

Let's consider a gate illustrated in FIG. 2B as a walk-through gate through which a user can pass without stopping. FIGS. 2A and 2B are drawing illustrating a case (prototype) where a walk-through gate (for instance entrance gate or ticket gate) is realized using a wireless tag (IC card) having a communication distance of, for instance, 3 to 5 meters. In FIG. 2A, wireless tags (IC cards) 20A and 20C may be, for instance, passive RF-ID tags (13.56 MHz or 920 MHz (Mega Hertz), 2.4 GHz (Giga Hertz) bands). Users (A and C) owning the wireless tags (IC cards) 20A and 20C are able to go through the gates in FIG. 2B without taking out their cards. In other words, the wireless tags (IC cards) 20A and 20C transmit ID information, an authentication apparatus (not shown) of the gates performs authentication, and the doors in FIG. 2B open. It is possible, however, for another user (B) in wireless areas 17A and 17C of the users (A and C) in FIG. 2A to go through the gate in FIG. 2B without possessing a wireless tag (IC card), and there remains an issue.

[Patent Literature 1]
Japanese Patent Kokai Publication No. JP2008-052549A
[Patent Literature 2]
Japanese Patent Kokai Publication No. JP2017-59060A
[Patent Literature 3]
Japanese Patent Kokai Publication No. JP2013-61875A

SUMMARY

An analysis of related technologies is given below.

When opening and closing of a door of an entrance/exit gate is controlled only by facial authentication without touching an IC card against an IC card reader, it is difficult to ensure recognition accuracy and throughput. As described above, the facial authentication includes: recognizing a user using a camera, extracting facial feature values, and searching a database that stores facial feature values. It is almost impossible, in particular due to issues such as collation accuracy or time constraints, to collate the a facial feature value of a user captured by a camera with a database in which a large amount (for instance several tens of thousands or more) of facial feature values are registered, for instance, without narrowing down the facial feature values of the collation target using an IC card or the like.

Further, without narrowing down the facial feature values of a collation target and without having a user be aware of a surveillance camera that captures the user, it is difficult to perform 1: N collation from a small sized non-frontal face image, using, for instance, a video (moving image).

Therefore, the present invention was invented in order to solve the problems above, and it is an object of the invention to provide an apparatus, facial authentication system, method, and program, each enabling improvement of throughput of gate pass-through without requiring card touching, etc.

According to an aspect of the present invention, there is provided a gate apparatus including:

a reader part that receives one or more identifiers transmitted by one or more wireless tags of one or more users entering a wireless area located outside one end of a longitudinal direction of a gate;

an acquisition part that acquires one or more individual facial feature values registered in association with the one or more identifier received from the one or more wireless tags;

an imaging part that captures image of the user;

an extraction part that extracts a facial feature value from image data captured by the imaging part; and a face collation part that receives the facial feature value extracted by the extraction part and performs collation to check whether or not the feature value extracted matches any one of one or more facial feature values acquired by the acquisition part.

According to another aspect of the present invention, there is provided a gate apparatus including:

a reader part that receives one or more identifiers transmitted by one or more wireless tags of one or more users entering a wireless area located outside one end of a longitudinal direction of a gate;

an imaging part that captures image of the user; and an opening and closing control part that sets a gate exit in an open state or in a closed state, based on whether or not the facial feature value extracted from the image captured by the imaging part match a facial feature value registered in association with the identifier.

According to an aspect of the present invention, there is provided a facial authentication system including:

an acquisition part that when a reader part receives one or more identifiers transmitted by one or more wireless tags of one or more users not yet entering a gate, acquires a facial feature value registered in association with each identifier;

an extraction part that extracts a facial feature value from an image in which the user is imaged; and a face collation part that receives the facial feature value extracted by the extraction part and performs collation to check whether or not the feature value extracted matches any one of one or more facial feature values acquired by the acquisition part.

According to an aspect of the present invention, there is provided a facial authentication method including:

upon reception, by a reader part, of one or more identifiers transmitted by one or more wireless tags of one or more users not yet entering into a gate, acquiring individual one or more facial feature values registered in association with the individual one or more identifiers;

extracting a facial feature value from an image in which the user is imaged; and collating the extracted feature value with the one or more facial feature values acquired to check whether or not there is a match.

According to an aspect of the present invention, there are provided a program causing a computer to execute processing comprising:

upon reception, by a reader part, of one or more identifiers transmitted by one or more wireless tags of one or more users not yet entering into a gate, acquiring individual one or more facial feature values registered in association with the individual one or more identifiers;

extracting a facial feature value from an image in which the user is imaged; and collating the extracted feature value with the one or more facial feature values acquired to check whether or not there is a match.

According to the present invention, the program recording medium is constituted by a semiconductor storage such as RAM (Random Access Memory), ROM (Read Only Memory), or EEPROM (Electrically Erasable and Programmable ROM), or a non-transitory computer-readable recording medium such as HDD (Hard Disk Drive), CD (Compact Disc), and DVD (Digital Versatile Disc).

According to the present invention, it is possible to improve throughput of gate pass-through without requiring card touching, etc. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 6 is a flowchart describing the operation of the first example embodiment of the present invention.

FIG. 9B is a diagram illustrating FIG. 9A.

FIG. 17 is a diagram illustrating an operation sequence of the first mode of the wireless tag.

FIG. 18A is a diagram illustrating a second mode of the wireless tag.

FIG. 19 is a diagram illustrating an operation sequence of the second mode of the wireless tag.

FIG. 20 is a diagram illustrating the configuration of a fourth example embodiment of the present invention (corresponding to the second mode of the wireless tag).

FIG. 21 is a diagram illustrating a third mode of the wireless tag.

DETAILED DESCRIPTION

An example embodiment of the present invention will be described. According to one of embodiments of the present invention, when a reader part provided at a gate receives one or more identifiers transmitted by one or more wireless tags of one or more users who have entered a wireless area located outside one end of a longitudinal direction of the gate (for instance, an area outside an entrance of the gate), an acquisition part acquires a facial feature value registered in association with each of one or more identifiers received from the one or more wireless tags. An imaging part captures an image of the user (for instance, a user entering the gate), an extraction part extracts a facial feature value from the captured image data, and a face collation part checks whether or not the facial feature value extracted by the extraction part match one of the one or more facial feature values acquired by the acquisition part.

According to one of embodiments of the present invention, the acquisition part is configured to acquire a facial feature value corresponding to an identifier received by the reader part from the wireless tag before the imaging part captures image of the user entering the gate.

According to one of embodiments of the present invention, there is provided an opening and closing control part that opens and closes a gate exit. The opening and closing control part may be configured to open the gate exit when the result of collation by the face collation part indicates that the facial feature value extracted by the extraction part match any one of one or more facial feature values acquired by the acquisition part, and close the gate exit when there is no match.

According to one of embodiments of the present invention, by acquiring in advance a feature value based on an identifier of a wireless tag from, for instance, a data server that stores facial feature values before a user approaches the gate, it becomes possible to perform facial authentication at the same time as an image of the user is captured. As a result, a plurality of users can pass through the gate smoothly.

On the other hand, in case where the imaging part performs image capturing in advance, it is difficult to define the first person when a plurality of users are lined up. As a result, images of many users who are not the target will be captured. Further, if the wireless tag ID of a user is read after the imaging part captures image of the user, it will take time to acquire a facial feature value corresponding to the ID from the data server and perform face collation, making it difficult to achieve smooth facial authentication.

Example Embodiment 1

Figure 3A:
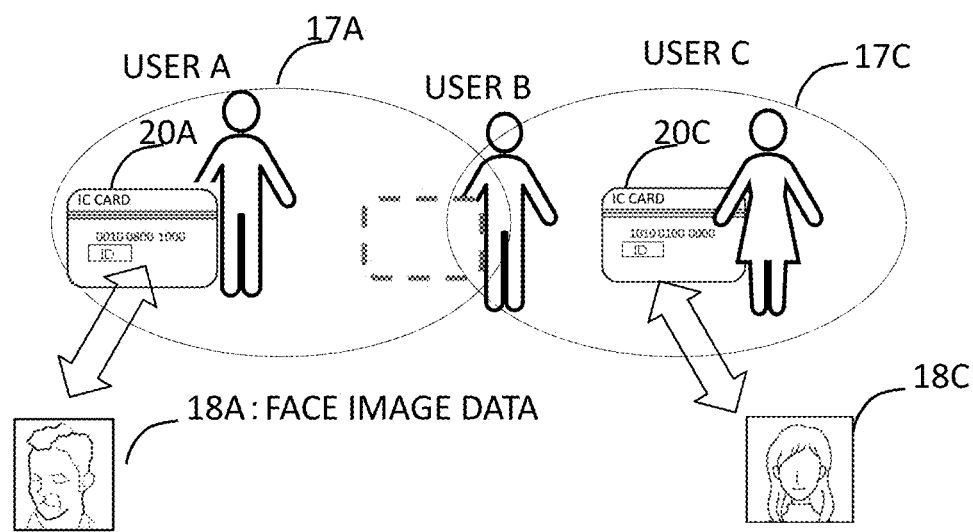
FIG. 3A is a diagram illustrating a first example embodiment of the present invention.
Figure 3B:
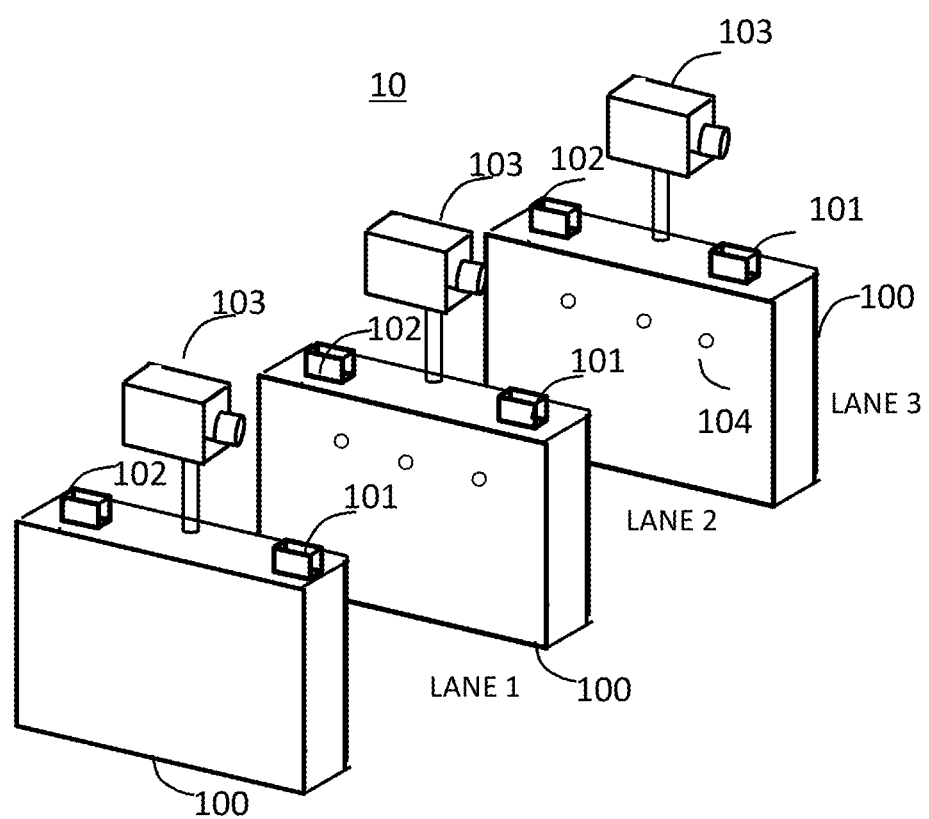
FIG. 3B is a diagram illustrating the first example embodiment of the present invention.

FIG. 3A and FIG. 3B illustrates a first example embodiment of the present invention. In the first example embodiment of the present invention, a user carries, for instance, a UHF (Ultra High Frequency)-band (915 MHz (MegaHertz)-928 MHz: 920 MHz) or microwave-band (2.45 GHz (GigaHertz)) passive wireless tag (RFID (Radio Frequency Identifier) tag (also referred to as "remote IC card" in a case of an IC card)) (communication distance: 2 to 5 meters), though not limited thereto. When a user carrying a passive wireless tag approaches the gate, the wireless tag, upon reception of power supplied by a reader 101, replies the identifier (ID) of the tag.

It is noted that the following description assumes the utilization of an RFID having a communication distance of 2 to 5 meters for a one-way entry gate or exit gate and two-way entry/exit gate, however, a UHF-band active type RFID tag (with a built-in battery) having a communication distance of about 10 meters may be used depending on a configuration of the gate (width, length, etc.). Further, the wireless tags 20A and 20C in FIG. 3A will be referred to as wireless tag 20 when it is unnecessary to distinguish between them.

With reference to FIG. 3B, a gate system 10 includes a 3-lane gate apparatus 100. The reader 101 (first reader) provided at one side (for instance, an entrance side) of a longitudinal direction of the gate apparatus 100 may be a reader/writer that reads/writes from/to the wireless tag 20 that has entered a wireless area. For instance, in a system that writes information to a storage apparatus of the wireless tag when a user enters/exits, the reader of the present description includes an RFID reader/writer.

When the reader 101 receives one or more IDs from one or more wireless tags of one or more users entering a wireless area (wireless area located outside the gate entrance), a facial authentication apparatus (not shown) provided in or outside the gate apparatus 100 searches a database (not shown) using each ID as a key, and acquires from the database a facial feature value registered in advance in association with each ID.

When a plurality of the wireless tags 20 transmit IDs simultaneously and signals collide with each other, the reader 101 may use, for instance, a anti-collision function and sequentially read IDs of the wireless tags 20 (in a sequential order in time).

Further, when detecting communication by another wireless tag (during transmitting an ID), the wireless tag 20 may transmit an ID after waiting for a predetermined backoff time. Similarly, the reader may start communication after waiting for a predetermined backoff time when detecting communication by another reader.

When one or more users line up in a lane of the gate, image capturing is performed by a camera 103 wherein image data that includes a face of a user(s) is acquired, and the facial authentication apparatus (not shown) detects the face and extracts a facial feature value. The camera 103 may be configured to capture an image of a user who has entered in the gate, when the user enters into the gate and a sensor 104 (for instance infrared sensor) detects progression of the user.

The camera 103 may acquire an image at, for instance, 30 frames per second. Alternatively, the camera 103 may acquire a frame image (for instance one or more still images) based on a control signal from an apparatus that controls the camera 103 (for instance an image data acquisition part 116 in FIG. 5). The camera 103 includes a buffer (not shown) (circular buffer or ring buffer) and may overwrite the buffer from the beginning when the buffer becomes full with captured images. The buffer for storing a video or still image captured by the camera 103 may be provided on the apparatus that controls the camera 103.

Instead of causing the camera 103 to capture an image of a user when progress of the user in the gate is detected by the sensor 104, the camera 103 may be configured to capture the image when a reader 102 (second reader) provided at another side (exit side) of the longitudinal direction of the gate receives an ID of the wireless tag 20.

The face is detected from the image data captured by the camera 103, and extraction of facial feature values of the detected face are performed.

When the wireless tag 20 communicates with the reader 102 on the exit side of the gate and replies an ID of the wireless tag 20, a collation target(s) may be selected (narrowed down) from facial feature values of one or more users (one or more persons within a wireless communication range of 2 to 5 meters in the lane direction) according to, for instance, the moving direction of users or priorities of facial feature values; and the selected (narrowed down) facial feature values may be collated with the facial feature value extracted from the image data captured by the camera 103.

Since a user (B in FIG. 3A), who does not own a wireless tag (card), did not have facial feature values acquired in advance corresponding to a wireless tag ID received by the reader 101, there is no match for the facial feature value of this user (B in FIG. 3A) extracted from the image data captured by the camera 103. As a result, the door of the gate exit is closed, preventing the user without a wireless tag (card) from going through the gate.

It is noted that he communication range (coverage) of the readers 101 and 102 may be configured to avoid radio wave interference between the readers with the reader 101 in the lanes adjacent to each other. In this case, the antenna of the reader 101 may have, for instance, a multi-antenna configuration which may be beamformed in the direction of the lane.

Figure 4:
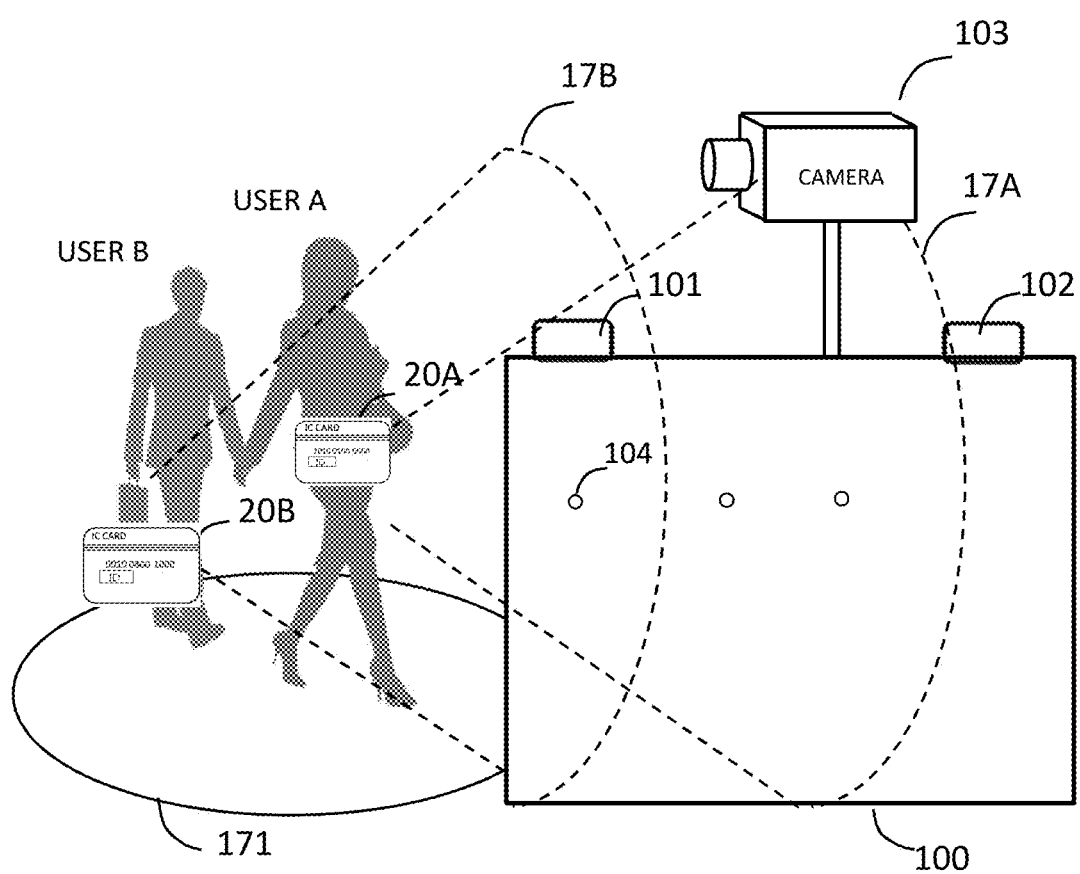
FIG. 4 is a diagram illustrating the first example embodiment of the present invention.

FIG. 4 is a diagram schematically illustrating the first example embodiment of the present invention. In the schematic diagram of FIG. 4, sizes of and ratios between users, the wireless tag 20, the gate apparatus 100, the camera 103, and the readers 101 and 102 are not taken into consideration.

With reference to FIG. 4, when the wireless tag 20A, owned by the user A, enters a wireless area 171 of the reader 101 provided at one side (entrance side) of the longitudinal direction of the gate apparatus 100, the wireless tag 20A receives a radio wave transmitted from the reader 101 and replies an ID of the wireless tag 20A. In FIG. 4, the wireless area 171 of the reader 101 includes a predetermined area (in front of the gate entrance) outside one side (entrance) of the longitudinal direction of the gate apparatus 100. The wireless tag 20B of the user B who has entered the wireless area 171 also receives a radio wave from the reader 101 and replies the ID of the wireless tag 20B. In this case, facial feature values corresponding to IDs of the wireless tags 20A and 20B are acquired from the database (data server, not shown). The reference symbols 17A and 17B designate schematically illustrated communication ranges of the wireless tags 20A and 20B.

When the wireless tags 20A and 20B simultaneously transmit their IDs (occurrence of collision), the reader 101 can not recognize the wireless tag IDs (occurrence of reception error). In this case, the reader 101 may instruct the wireless tags 20A and 20B to change their reply timing using, for instance, an anti-collision function of the ALOHA method, and have them reply sequentially their IDs at different timings. Alternatively, the wireless tags 20A and 20B may be configured to stop transmitting their own IDs for a predetermined period of time when detecting another wireless tag transmitting an ID.

Figure 1:
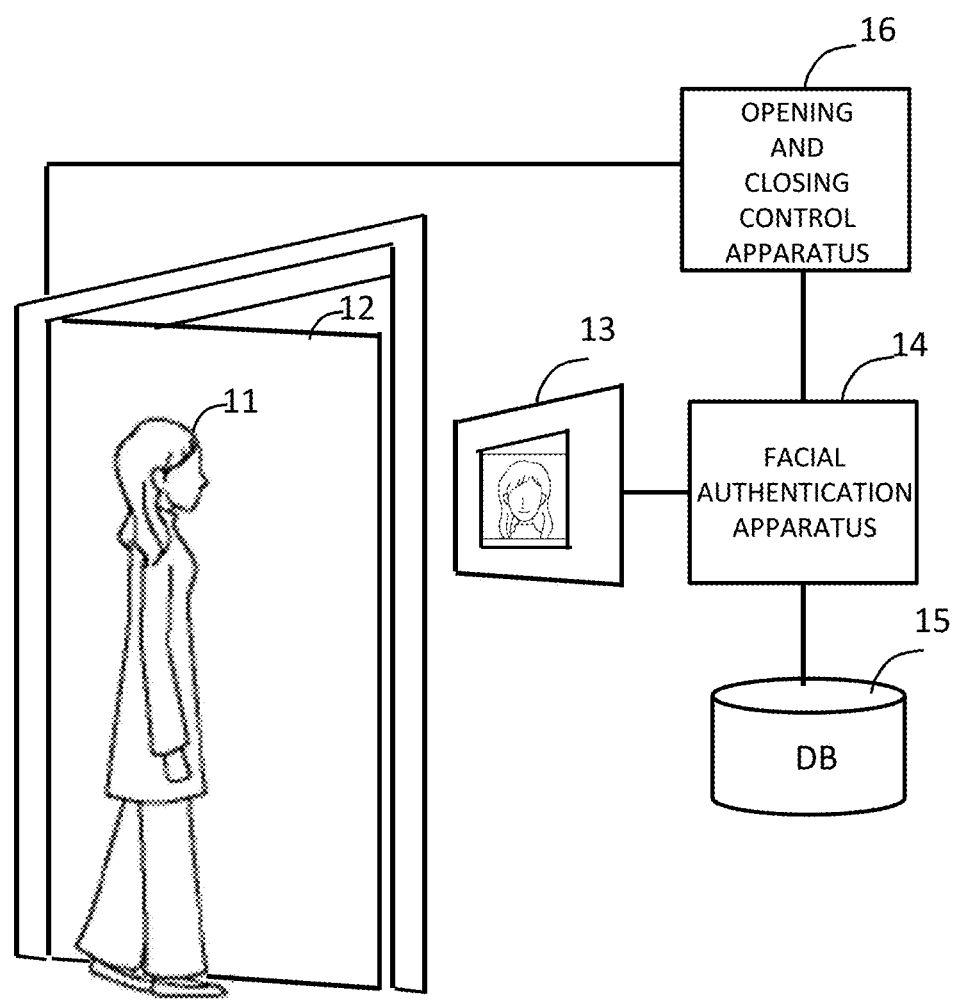
FIG. 1 is a diagram illustrating a technology related to a door opening and closing system using facial authentication.
Figure 2A:
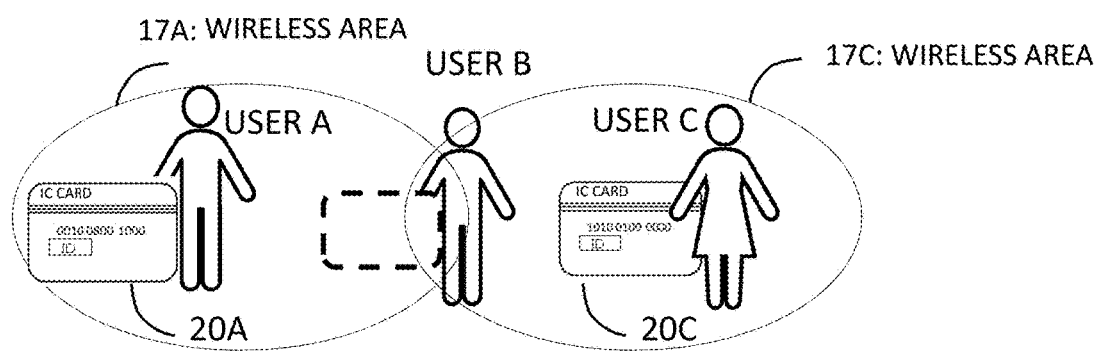
FIG. 2A is a diagram illustrating a gate using a wireless tag (remote IC card).
Figure 2B:
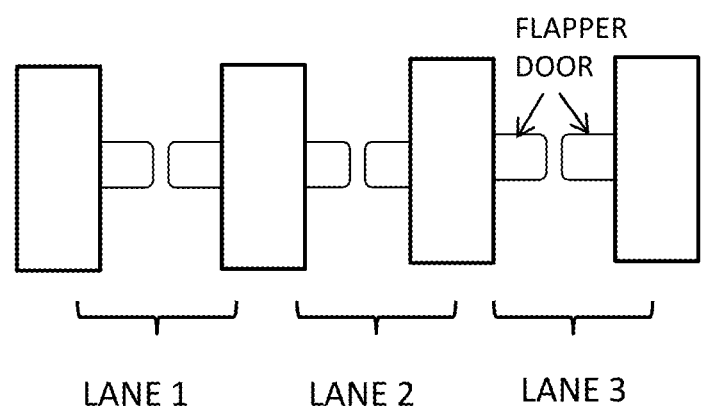
FIG. 2B is a diagram illustrating a gate using a wireless tag (remote IC card).

When the wireless tag 20A of the user A enters into a wireless area of the reader 102 provided at the other side (exit side) of the longitudinal direction of the gate apparatus 100, communicates with the reader 102 and replies the ID of the wireless tag 20A, and the reader 102 receives the ID, collation whether or not the facial feature value of the users A and B acquired in advance match the facial feature value extracted from image data captured by the camera 103 (for instance the facial feature value of the user A extracted from the image data) is performed. When the extracted facial feature value match one of the acquired facial feature values (the facial feature values corresponding to the IDs received by the reader 101) as a result of the collation, a gate (for instance refer to the flapper gate in FIG. 2B) of the gate apparatus 100 remains open.

It is noted that out of a plurality of sets of facial feature values acquired from the database (not shown) corresponding to a plurality of wireless tag IDs received by the reader 101, a facial feature value corresponding to an ID received by the reader 102 (the same ID received by the reader 101 and then by the reader 102) may be prioritized and collated with the facial feature value extracted from the image data captured by the camera 103.

According to the first example embodiment of the present invention, the number of facial authentication targets can be narrowed down using a wireless tag such as an RFID, and a user can go through the gate without making unnatural motion or presenting/touching a card when the user undergoes personal authentication. Further, accuracy in facial authentication can be improved by narrowing down the number of authentication targets.

Figure 5:
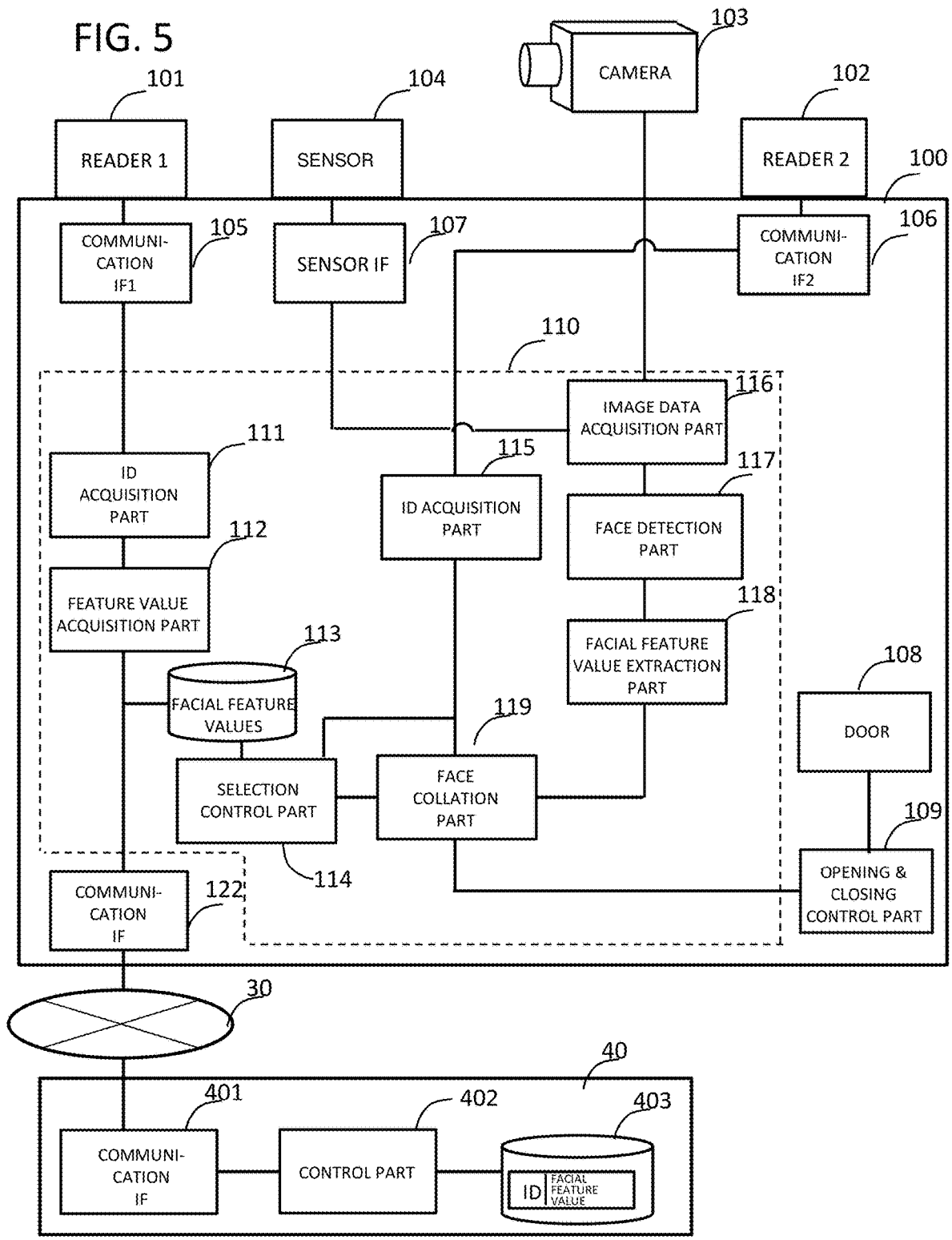
FIG. 5 is a diagram illustrating the configuration of the first example embodiment of the present invention.

FIG. 5 is a diagram illustrating a configuration of the first example embodiment of the present invention. A one-way gate apparatus 100 such as an entrance gate includes the reader (first reader) 101, the reader (second reader) 102, the camera 103, the sensor (such as an infrared sensor) 104 that senses movement of a user in a lane, interfaces 105 and 106 that communicate with the readers 101 and 102, a sensor interface 107, an opening and closing control part 109 that controls the opening and closing of the gate, a gate (door) 108, a facial authentication apparatus 110, and a communication interface 122. The interfaces 105 and 106 and the sensor interface 107 may be RS232C, Ethernet (registered trademark), or USB (Universal Serial Bus). Further, the camera 103 may be provided facing towards a direction of a passage entrance of the gate. It is noted that there may be provided a single camera 103 for a plurality of lanes. A plurality of the sensors (infrared sensors) 104 may be arranged at a predetermined interval in the longitudinal direction of the gate to function as sensors for following movement of a user in the gate.

The facial authentication apparatus 110 includes ID acquisition parts 111 and 115 that acquire a wireless tag ID received respectively by the readers 101 and 102, a feature value acquisition part 112 that acquires from a data server 40 a facial feature value corresponding to an ID acquired by the ID acquisition part 111, a storage apparatus 113 that stores facial feature values acquired from the data server 40, a selection control part 114 that selects facial feature value(s) stored in the storage apparatus 113 in order or based on priority and hands over the selected facial feature value(s) to a face collation part 119, an image data acquisition part 116 that acquires image data from the camera 103, a face detection part 117 that extracts a face portion from the image data, a facial feature value extraction part 118 that extracts a facial feature value of the face extracted, and a face collation part 119.

The facial feature value acquisition part 112 transmits a feature value query that includes ID information through the communication interface 122 via a network to the data server 40.

The data server 40 includes a communication interface 401, a control part 402 that controls access to the database, and a storage apparatus (database) 403 that stores IDs in association with facial feature values.

The control part 402 uses an ID included in a search request (query) transmitted by the facial authentication apparatus 110 as a search key, and reads out the facial feature values corresponding to the ID.

The storage apparatus (database) 403 may be configured to store face image information captured when a user registers, in addition to IDs and facial feature values.

The search request (query) may include identification information and location information, etc., of the gate apparatus 100 which a sending source of the request. The data server 40 may be configured to encrypt a facial feature value corresponding to the ID for transmission to the gate apparatus 100, and also encrypt and store facial feature values.

The feature value acquisition part 112 receives the facial feature value retrieved from the data server 40 and stores it in the storage apparatus 113. At this time, the feature value acquisition part 112 may store the facial feature value in association with the ID. The feature value acquisition part 112 may store a reception time of the wireless tag ID or a reception time of the facial feature values from the data server 40 in the storage apparatus 113 in association with the ID and the facial feature value. In a case where an encrypted facial feature value is transmitted from the data server 40, the feature value acquisition part 112 decrypts the facial feature value to store the decrypted facial feature value in the storage apparatus 113.

The selection control part 114 determines in what order the face collation part 119 collates the facial feature values stored in the storage apparatus 113 and selects the facial feature value to be collated from the facial feature values stored in the storage apparatus 113.

When the reader 102 communicates with a wireless tag and receives an ID, the selection control part 114 may select the facial feature value to be collated from the facial feature values stored in the storage apparatus 113 in a predetermined priority order and provide the selected facial feature value to the face collation part 119. That is, when the reader 102 receives a wireless tag ID after the reader 101 has done so, the face collation part 119 may perform facial feature value collation.

The selection control part 114 may select, in the order that, for instance, the reader 101 received wireless tag IDs (a facial feature value corresponding to an ID received earliest is selected first), a feature value stored in the storage apparatus 113 and deliver the selected feature value to the face collation part 119. In this case, the ID acquisition part 111 may add a reception time of an ID received from the wireless tag. The storage apparatus 113 stores the reception time of the ID in association with the facial feature value acquired using the ID.

Alternatively, the selection control part 114 may determine in what order the facial feature values acquired by the feature value acquisition part 112 are provided to the face collation part 119 based on an order in which the feature value acquisition part 112 acquired facial feature values from the data server 40. For instance, the selection control part 114 may provide the facial feature value acquired from the data server earliest to the face collation part 119 as the first collation target.

Regarding the facial feature values acquired by the feature value acquisition part 112 from the data server 40, the selection control part 114 may provide the facial feature value corresponding to an ID received by both of the reader 101 and the reader 102 from the same wireless tag to the face collation part 119 preferentially over the facial feature values corresponding to an ID received by one of the readers 101 and 102 from a wireless tag. For instance, the facial feature value corresponding to the ID received from the wireless tag 20A of the user A in FIG. 4 may be prioritized and collated before the facial feature value corresponding to the ID received from the wireless tag 20B of the user B. This is because the ID of the wireless tag 20A of the user A has been received by both readers 101 and 102, but only the reader 101 has received the ID of the wireless tag 20B of the user B.

Further, the selection control part 114 may determine in what order the facial feature values acquired by the feature value acquisition part 112 are provided to the face collation part 119, based on a moving direction of users in the gate (a second example embodiment described later).

When the sensor 104 detects a user passing through, the image data acquisition part 116 acquires image data from the camera 103. The image data acquisition part 116 may be configured to instruct the camera to capture an image and acquire the image, when the image data acquisition part 116 receives a detection signal from the sensor interface 107.

Alternatively, the image data acquisition part 116 may be configured to acquire a video or still image (one or more continuous images) captured by the camera 103 and accumulate the images in the buffer (not shown) (circular buffer or ring buffer). Then, when receiving a detection signal from the sensor interface 107, the image data acquisition part 116 may provide an image (frame image) corresponding to the detection timing to the face detection part 117. That is, the reception of the ID of a wireless tag by the reader 102 may trigger the acquisition of image data by the camera 103 and the image data acquisition part 116.

Alternatively, the image data acquisition part 116 may be configured to acquire image data from the camera 103 when the reader 102 receives a wireless tag ID. In this case, the signal line from the sensor interface 107 to the image data acquisition part 116 in FIG. 5 is omitted, and an output of the ID acquisition part 115 is supplied to the image data acquisition part 116. The same applies to other example embodiments.

The face detection part 117 detects a face in the image data acquired sequentially by the image data acquisition part 116. The face detection part 117 detects a face of a user, for instance, walking through the lane as a detected face image from the image data acquired sequentially by the image data acquisition part 116. The face outline (edges) may be extracted from a face image using horizontal and vertical filters. The algorithm used by the face detection part 117 for face detection is not particularly limited to a specific one, and various algorithms may be used. Further, when detecting a plurality of persons in image data, the face detection part 117 may send an instruction to the facial feature value extraction part 118 with a priority order for face collation. In this case, the facial feature value extraction part 118 may be instructed to detect a feature value from the face image in descending order from the longest eye-to-eye distance to the shortest. Alternatively, the facial feature value extraction part 118 may detect a feature value in the order of area size of a face image.

The facial feature value extraction part 118 extracts a facial feature value, i.e., a feature value of a face image, from each of the face images detected by the face detection part 117. It is noted that the facial feature value may be configured as a vector including a combination of scalar quantity components representing features of the face image. The components of the feature values are not particularly limited, and various types of components can be used. For instance, the components of the feature values may include positional relationships such as a distance and an angle between feature points set at centers or end points of facial organs, such as eyes, nose and mouth, a curvature of an outline of a face, and a face surface (skin) color distribution and grayscale values, etc. The number of components of the feature values is not particularly limited, and it can be set as appropriate according to a required collation accuracy, processing speed, etc.

The facial feature value extraction part 118 may be configured to temporarily save each detected face image in association with a detection number that identifies the image data and the imaging time when the detected face image was captured, in addition to the face image data and the facial feature value.

The face collation part 119 compares the feature value extracted by the facial feature value extraction part 118 with the registered facial feature value, for instance, in the order selected by the selection control part 114, and determines that the facial feature values are of the same person when, for instance, among the registered images, the highest sum of similarities exceeds a threshold value, it is determined that the registered image and the feature value extracted from the captured image are an image of an identical person. The facial feature value determined by the face collation part 119 to match the feature value extracted by the facial feature value extraction part 118 may be deleted from the facial feature values stored in the storage apparatus 113 via the selection control part 114.

It is noted that the storage apparatus 113 may be reset (emptied) via the selection control part 114 when the readers 101 and 102 are in a state in which they do not receive IDs from the wireless tags for a predetermined period of time (There is no user who is standing in front of the gate or is passing through the gate, an empty state).

FIG. 6 is a flowchart describing an example of a processing procedure according to the first example embodiment of the present invention. FIG. 6 illustrates an example in which an IC card is used as the wireless tag without being limited thereto.

Upon receiving a radio wave and power from the reader 101, the wireless tag (IC card) reads an ID stored in the storage apparatus in the wireless tag (IC card) and wirelessly transmits the ID to the reader 101 (S101).

The ID acquisition part 111 acquires the ID of the wireless tag (IC card) received by the reader 101 (S102).

The feature value acquisition part 112 acquires a facial feature value(s) from the data server 40 using the ID as a key and stores the facial feature value(s) in the storage apparatus 113 (S103).

When a user enters a lane at the gate and the wireless tag (IC card) of the user receives a radio wave from the reader 102, the wireless tag replies the ID thereof (S104).

When the reader 102 receives the ID from the wireless tag (IC card), the selection control part 114 determines in what order the facial feature values stored in the storage apparatus 113 are collated, and selects a set of facial feature values to be collated from the facial feature values stored in the storage apparatus 113 (S105). That is, when the reader 102 receives the ID from the wireless tag of the user entering the gate, the face collation part 119 may perform face collation after the selection control part 114 narrows down the facial feature value(s) acquired corresponding to the ID(s) of the wireless tag(s) owned by one or more users outside the gate (one or more persons within the wireless communication range in the lane direction) to a predetermined number of collation targets according to, for instance, the moving direction of the users or the priority order of facial feature values. In this case, the face collation part 119 can collate the facial feature values narrowed down to the predetermined number of persons with the facial feature value extracted from the image data captured by the camera 103.

As the user enters the gate and moves forward in the lane, the sensor 104 detects the user (S106). Note that the step S106 occurs after, for instance, the feature value acquisition part 112 has acquired the feature value corresponding to the ID received from the wireless tag of the user when the user still was outside the lane of the gate.

When the sensor 104 detects pass through of the user, the image data acquisition part 116 acquires image data from the camera 103, and the face detection part 117 detects a face in the image data (S107). It is noted that the camera 103 may capture an image of a face of the user after the reader 101 receives a wireless tag ID, the feature value acquisition part 112 acquires a facial feature value corresponding to the ID, and the reader 102 receives the wireless tag ID. Alternatively, depending on, for instance, external dimensions of the gate apparatus 100 (for instance, a longitudinal dimension, a distance between the readers 101 and 102, etc.), the camera 103 may capture an image of the user and the image data acquisition part 116 may acquire the image data from the camera 103 when the reader 102 receives the ID from the wireless tag after the reader 101 has done so.

The face detection part 117 acquires a face image of the person having, for instance, the largest face or the longest eye-to-eye distance (of a person with a face having the longest eye-to-eye distance and the eye-to-eye distance being sufficiently long) (S108). Then, the facial feature value extraction part 118 extracts a facial feature value of the face image detected by the face detection part 117 (S109).

The face collation part 119 collates the facial feature value extracted by the facial feature value extraction part 118 with the facial feature value selected by the selection control part 114 to see if they match. When they match, a match detection signal is outputted to the opening and closing control part 109 (S112). The door 108 remains open (S113). When the facial feature value extracted by the facial feature value extraction part 118 match the facial feature value selected by the selection control part 114, the selection control part 114 deletes the facial feature value stored in the storage apparatus 113. It is noted that in a case of a walk-through gate, the door (flapper door) 108 simply remains open, however, depending on how the gate apparatus 100 is utilized, the opening and closing control part 109 may momentarily close the door 108 when a user enters the gate and open the door 108 when receiving a match detection signal.

When the collation (between the facial feature value extracted by the facial feature value extraction part 118 and the facial feature value selected by the selection control part 114) by the face collation part 119 results in a mismatch, the selection control part 114 selects a next facial feature value to be collated from the facial feature values stored in the storage apparatus 113 and the face collation part 119 collates the facial feature value extracted by the facial feature value extraction part 118 with the next facial feature value selected. When the facial feature value extracted by the facial feature value extraction part 118 do not match any facial feature values stored in storage apparatus 113, the face collation part 119 outputs a mismatch signal to the opening and closing control part 109 (S114).

Upon receiving the mismatch signal, the opening and closing control part 109 closes the door 108 (S115).

Figure 7A:
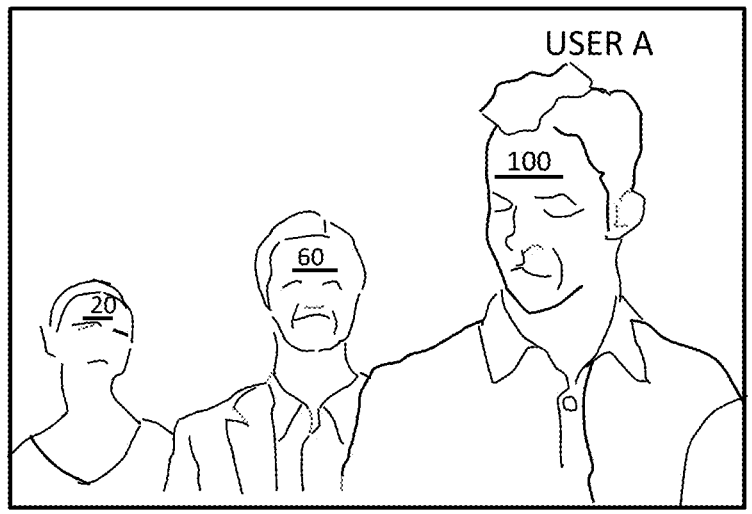
FIG. 7A is a diagram illustrating the first example embodiment of the present invention.

FIG. 7A is a diagram describing face detection by the face detection part 117 in FIG. 5. FIG. 7A illustrates an image that includes three users acquired by the image data acquisition part 116.

Figure 7B:
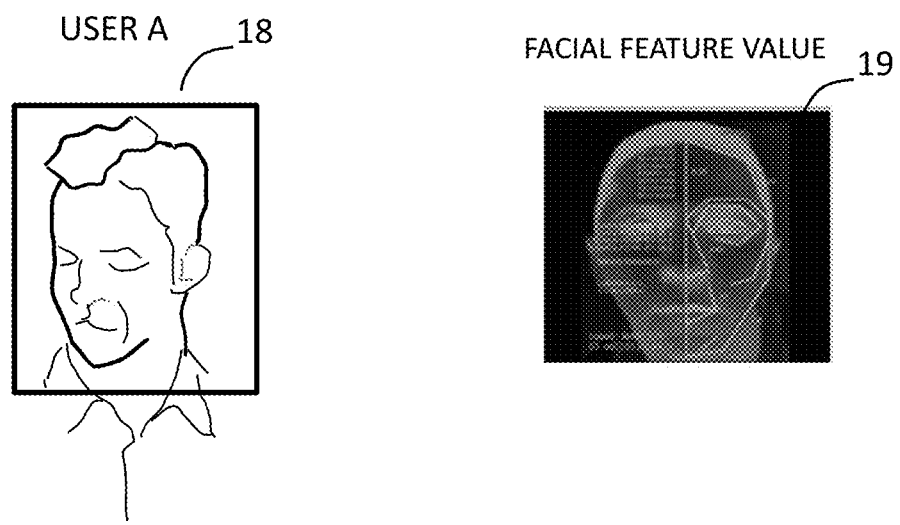
FIG. 7B is a diagram illustrating the first example embodiment of the present invention.

The face detection part 117 in FIG. 5 detects a face part in image data acquired by the image data acquisition part 116 and extracts the eye-to-eye distance. In FIG. 7A, the three face images have eye-to-eye distances of 100, 60, and 20. The face detection part 117 selects the face image of a person having the longest eye-to-eye distance (a user A having the eye-to-eye distances of 100), and the facial feature value extraction part 118 extracts a feature value (19 in FIG. 7B) of the selected face image (18 in FIG. 7B).

Variation of the First Example Embodiment

Figure 8:
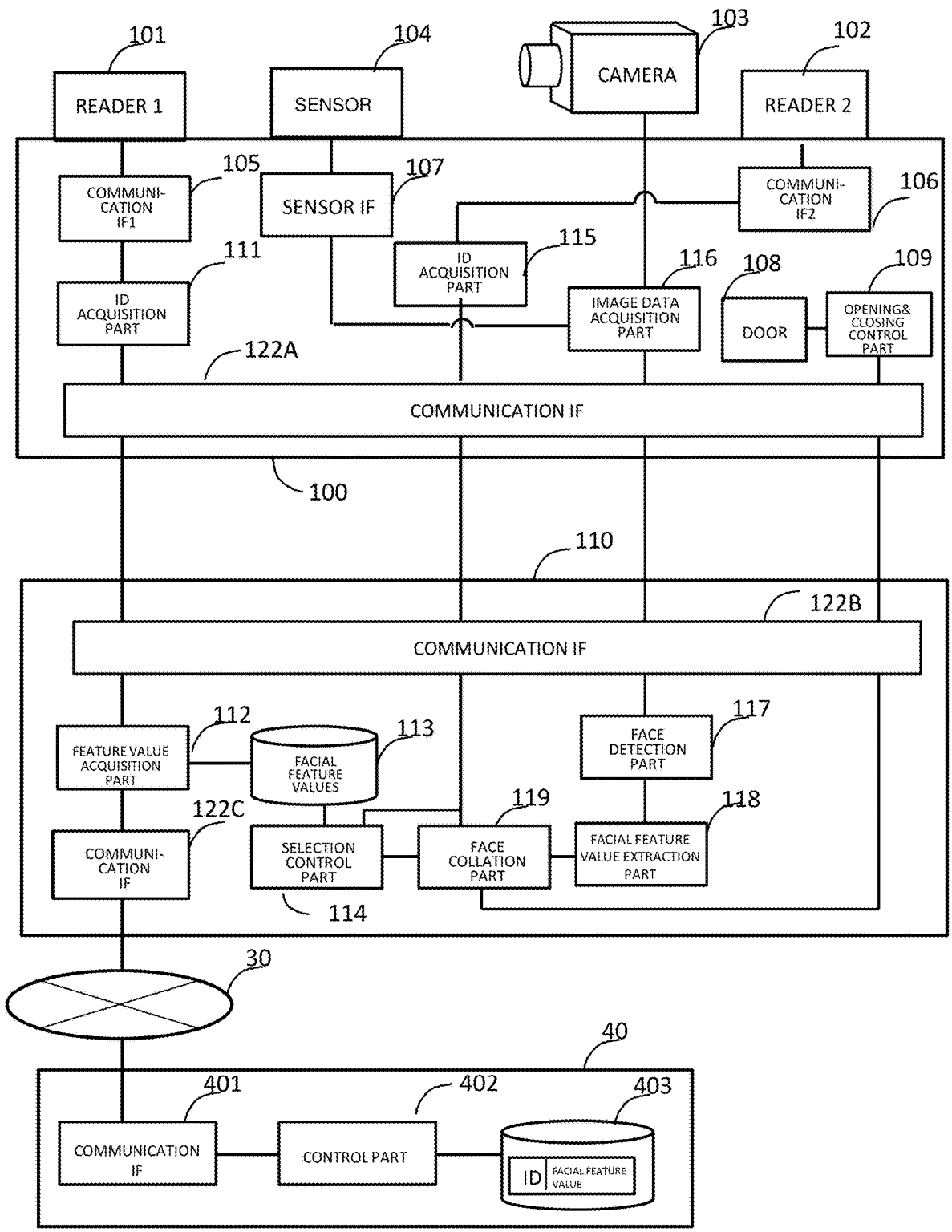
FIG. 8 is a diagram illustrating a variation of the first example embodiment of the present invention.

FIG. 8 is a diagram showing an example of a variation of the first example embodiment described with reference to FIG. 5. In the example of FIG. 5, the facial authentication apparatus 110 is provided within the gate apparatus 100. In the variation of the first example embodiment, the facial authentication apparatus 110 is provided outside the gate apparatus 100. Referring to FIG. 8, the facial authentication apparatus 110 includes a communication interface 122B that communicates with and connects to a communication interface 122A of the gate apparatus 100. It is noted that in FIG. 8, the ID acquisition parts 111 and 115, the image data acquisition part 116, and the opening and closing control part 109 connect to the communication interface 122B of the facial authentication apparatus 110 via the common communication interface 122A for the sake of simplicity, however, separate communication interfaces may be provided.

The communication interface 122A of the gate apparatus 100 may transmit a signal obtained by multiplexing signals from the ID acquisition parts 111 and 115 and the image data acquisition part 116 to the communication interface 122B, which may demultiplex (separate) and forward signals to transmission destinations, i.e., the feature value acquisition part 112, the face collation part 119, and the face detection part 117. The image data acquisition part 116 may be configured to perform compression encoding of image data acquired by the camera 103 and transmit the result to the face detection part 117, which then decodes the data. The communication interfaces 122A and 122B may be wired LANs (Local Area Network) such as Ethernet (registered trademark) or USB (Universal Serial Bus), RS232, RS485, GPIB (General Purpose Interface Bus), or wireless communication interfaces such as Bluetooth (registered trademark). The feature value acquisition part 112 of the facial authentication apparatus 110 connects to the network 30 via a communication interface 122C and acquires from the data server 40 facial feature values corresponding to an ID acquired by, for instance, the ID acquisition part 111. It is noted that the result of collation by the face collation part 119 are transmitted to the communication interface 122A of the gate apparatus 100 via the communication interface 122B, and the communication interface 122A forwards the results to the opening and closing control part 109, which opens or closes the door 108 according to the collation results.

In the gate apparatus 100, the image data acquisition part 116 and the camera 103 may be integrated. Alternatively, the image data acquisition part 116 may be provided in the facial authentication apparatus 110. In this case, image data captured by the camera 103 is transmitted to the image data acquisition part 116 of the facial authentication apparatus 110 via the communication interfaces 122A and 122B. The output signal of the sensor interface 107 is transmitted to the image data acquisition part 116 of the facial authentication apparatus 110 via the communication interfaces 122A and 122B.

In the variation of the first example embodiment, the operations of the facial authentication apparatus 110, the gate apparatus 100, and the data server 40 are the same as in the first example embodiment, and the explanation will be omitted to avoid duplication.

Second Example Embodiment

Figure 9A:
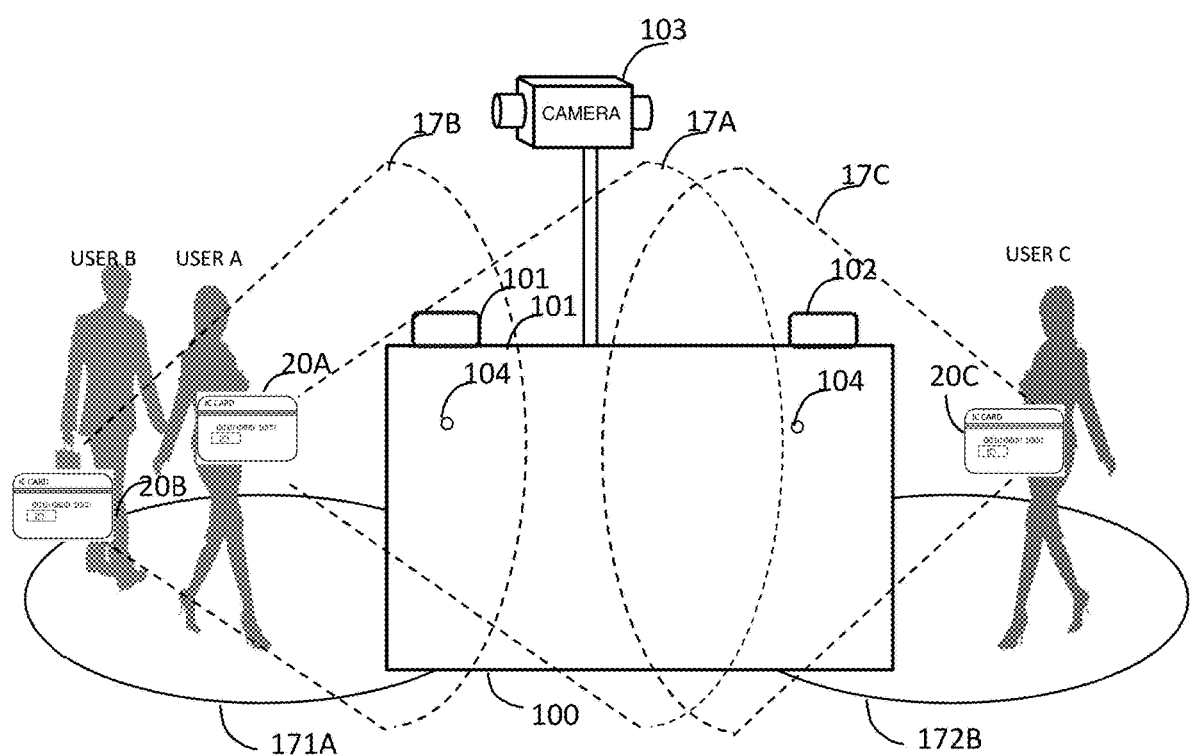
FIG. 9A is a diagram illustrating a second example embodiment of the present invention.

FIG. 9A is a diagram illustrating a second example embodiment of the present invention. The second example embodiment provides bi-directional lanes and the readers 101 and 102 determine a moving direction of a user. Referring to FIG. 9A, an ID of the wireless tag 20A of the user A is read by the reader 101 and then the reader 102 in this order, and a facial feature value registered in association with the ID is acquired from the data server 40. The user A moves from left to right in the drawing. The ID of the wireless tag 20B of the user B is read by the reader 101, and a facial feature value registered in association with the ID is acquired from the data server (DB) 40. The user C moves from the right to the left in the drawing, the ID of the wireless tag 20C is read by the reader 102, and a facial feature value registered in association with the ID is acquired from the data server (DB) 40. It is noted that in FIG. 9A, 171A and 172B designate wireless areas of the readers 101 and 102 outside an end and the other end of the gate, respectively.

A list in FIG. 9B shows whether or not the readers 101 and 102 has received a given ID (○ indicates "received"; x "not received"), the direction, the status of facial feature value acquisition from the data server, and facial authentication priority based on the direction in FIG. 9A. Regarding the priority control in face collation, the order may be determined based on the order in which facial feature values of IDs received by the reader 101 are acquired. Further, when both the readers 101 and 102 receive an ID (the user A in FIG. 9B), facial feature values acquired from the database (data server; not shown) may be prioritized and collated with facial feature value extracted from image data captured by the camera 103.

Figure 10:
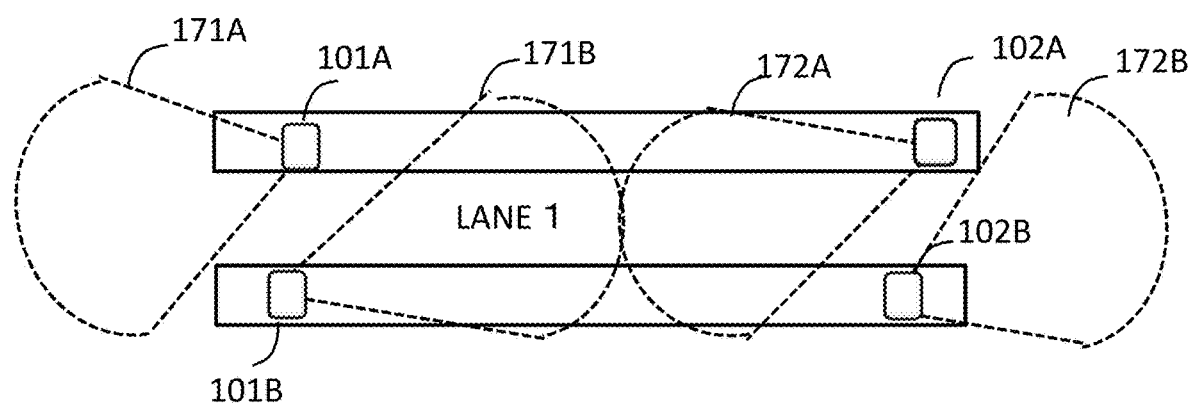
FIG. 10 is a diagram illustrating the second example embodiment of the present invention.

FIG. 10 is a plane schematic diagram illustrating antenna directivity of the readers 101 and 102 of the second example embodiment described with reference to FIGS. 9A and 9B.

With reference to FIG. 10, a reader 101A has a wireless area 171A (corresponding to 171A in FIG. 9A) expanding from an end of the longitudinal direction of the gate towards outside (left side in the drawing), and a reader 101B has a wireless area 171B expanding from an end of the longitudinal direction of the gate towards inside (right side in the drawing). A reader 102A has a wireless area 172A expanding from the other end of the longitudinal direction of the gate towards inside (left side in the drawing), and a reader 102B has a wireless area 172B (corresponding to 172B in FIG. 9A) expanding from the other end of the longitudinal direction of the gate towards outside (right side in the drawing). It is noted that the readers 101A and 101B may be configured to be the same unit (the reader 101). The readers 102A and 102B may also be configured to be the same unit (the reader 102).

Figure 11:
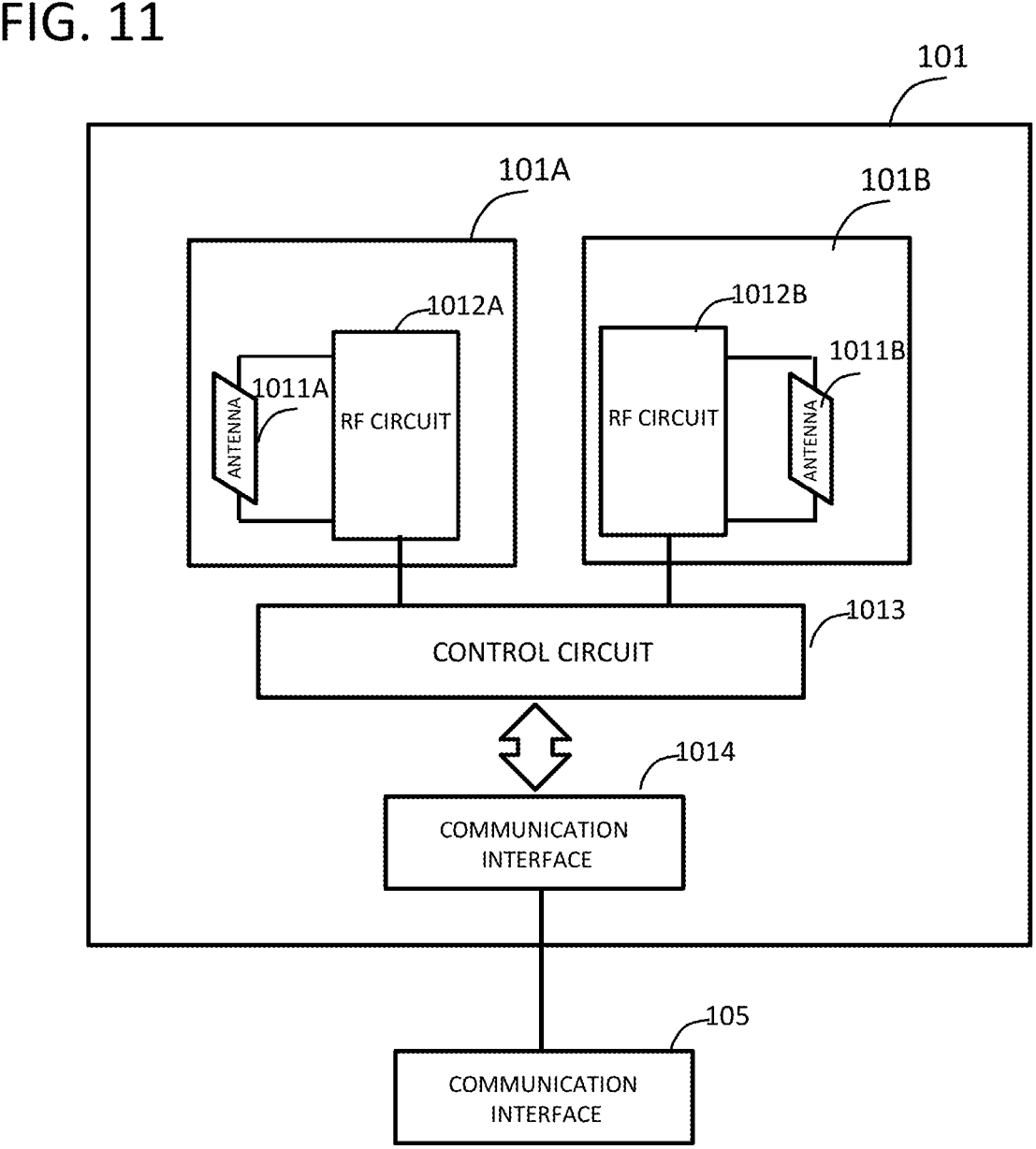
FIG. 11 is a diagram illustrating an example of a reader according to the second example embodiment of the present invention.

FIG. 11 is a diagram illustrating a configuration example of the reader 101 (or 102) of the second example embodiment. The reader 101 includes directional antennas 1011A and 1011B, RF (Radio Frequency) circuits 1012A and 1012B including a transmitter that converts a frequency of a transmission signal to a RF (Radio Frequency), power-amplifies the RF transmission signal and transmits the signal from the antennas 1011A and 1011B, and a receiver that amplifies a RF signal received by the antennas 1011A and 1011B and converts a frequency of the reception signal into an intermediate frequency, a control circuit 1013 that transmits/receives a transmission/reception signal to/from the RF circuits 1012A and 1012B, and a communication interface 1014. The readers 101A and 101B are constituted by the antennas 1011A and 1011B, and the RF circuit 1012A and 1012B.

Figure 12:
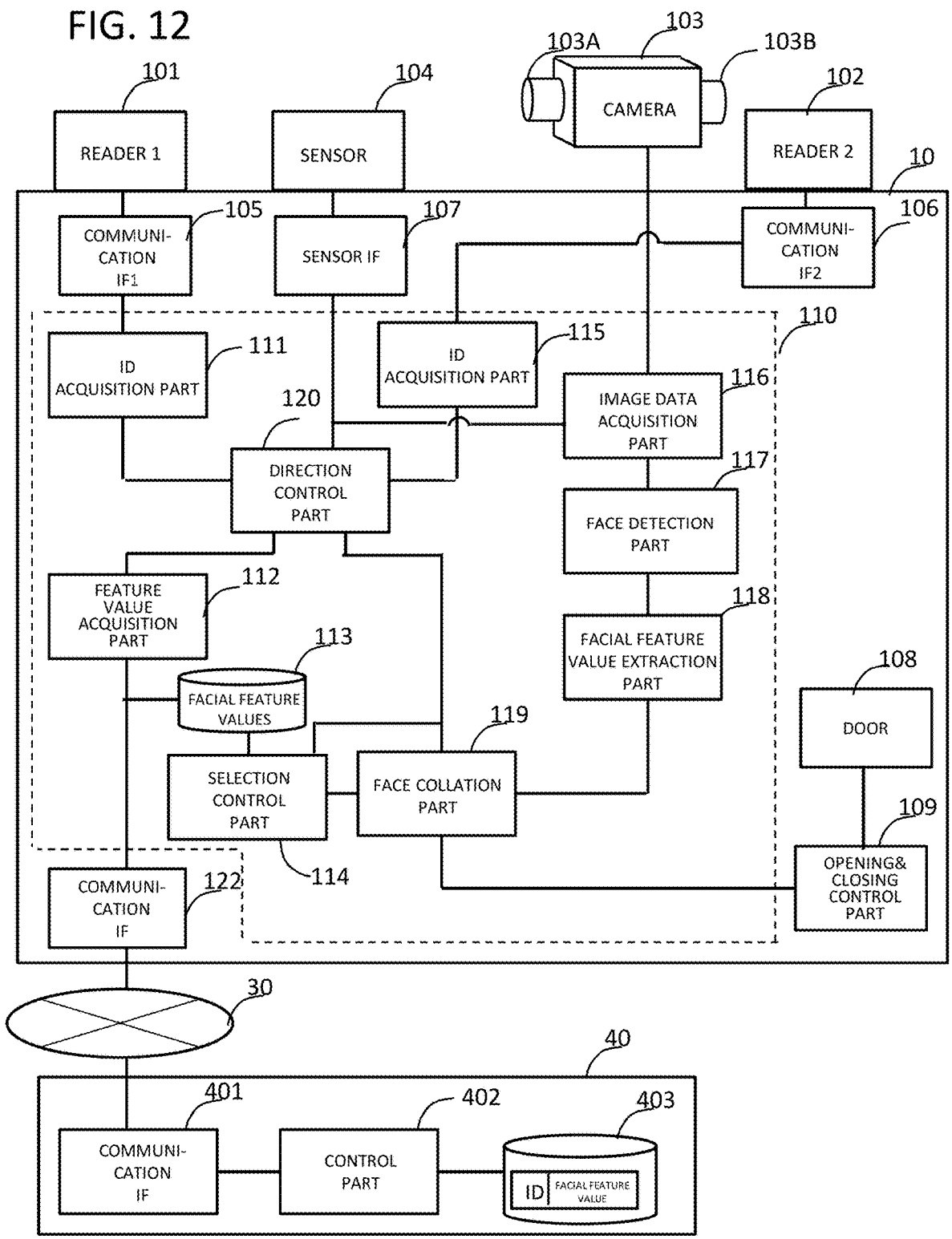
FIG. 12 is a diagram illustrating the configuration of the second example embodiment of the present invention.

FIG. 12 is a diagram illustrating the configuration of the second example embodiment. It is noted that the reader 101 includes the readers 101A and 101B, and the reader 102 include the readers 102A and 102B. The second example embodiment differs from the first example embodiment described with reference to FIG. 5 in that there is provided a direction control part 120 that detects a moving direction of a user based on which reader (101 or 102) receives an ID first when this ID of the same wireless tag is received by both the readers 101 and 102, acquires a feature value corresponding to the ID, and stores the feature value in the storage apparatus.

When the reader 101 receives the wireless tag ID first and then the reader 102 receives the wireless tag ID, it is presumed that the user owning this wireless tag is moving from a side of the longitudinal direction of the gate at which the reader 101 is provided, to the other side. Therefore, the camera 103 that captures an image of a user approaching the gate from a direction where the reader 101 is provided may be controlled to capture an image of this user.

The control circuit 1013 of the reader 101 in FIG. 11 adds, to an ID signal received from the RF circuits 1012A and 1012B, an identification code indicating from which antenna the ID signal is received and notifies the communication interface 105. The direction control part 120 is able to identify which antenna (1011A or 1011B) has received the ID signal. Similarly, regarding the reader 102, the direction control part 120 is able to identify which reader (102A or 102B) has received an ID signal.

With reference to FIG. 12, when the reader 101A (FIG. 10) receives an ID (=ID1) from a wireless tag, the direction control part 120 delivers the ID1 to the feature value acquisition part 112. The feature value acquisition part 112 acquires a facial feature value corresponding to the ID1 from the data server 40, and store the facial feature value in the storage apparatus 113. The direction control part 120 instructs the image data acquisition part 116 to acquire image data from a camera 103A. When the reader 102A (FIG. 10) receives the ID of the wireless tag, the direction control part 120 notifies the selection control part 114 of the ID. The direction control part 120 instructs the selection control part 114 to perform narrowing-down of a facial feature value(s) to be collated from the facial feature values acquired by the feature value acquisition part 112 and stored in the storage apparatus 113. The selection control part 114 selects a facial feature value from the facial feature values stored in the storage apparatus 113 according to collation priority order and provides the selected facial feature value to the face collation part 119.

When the reader 102B (FIG. 10) receives an ID (=ID1) from a wireless tag, the direction control part 120 delivers the ID1 to the feature value acquisition part 112. The feature value acquisition part 112 acquires facial feature value(s) corresponding to the ID2 (received by the reader 102B) from the data server 40 and store the facial feature value(s) in the storage apparatus 113. The direction control part 120 instructs the image data acquisition part 116 to acquire image data from a camera 103B facing a side opposite to the camera 103A. When the reader 101B (FIG. 10) receives the ID of the wireless tag, the direction control part 120 instructs the selection control part 114 to perform narrowing-down of a facial feature value(s) to be collated from the facial feature values acquired by the feature value acquisition part 112.

The selection control part 114 may determine which direction, from a first side of the longitudinal direction of the gate to a second side or from the second side of the longitudinal direction of the gate to the first side, is prioritized based on the order in which the readers 101A and 102A and the readers 102B and 101B (refer to FIG. 10) receive an ID.

Figure 13:
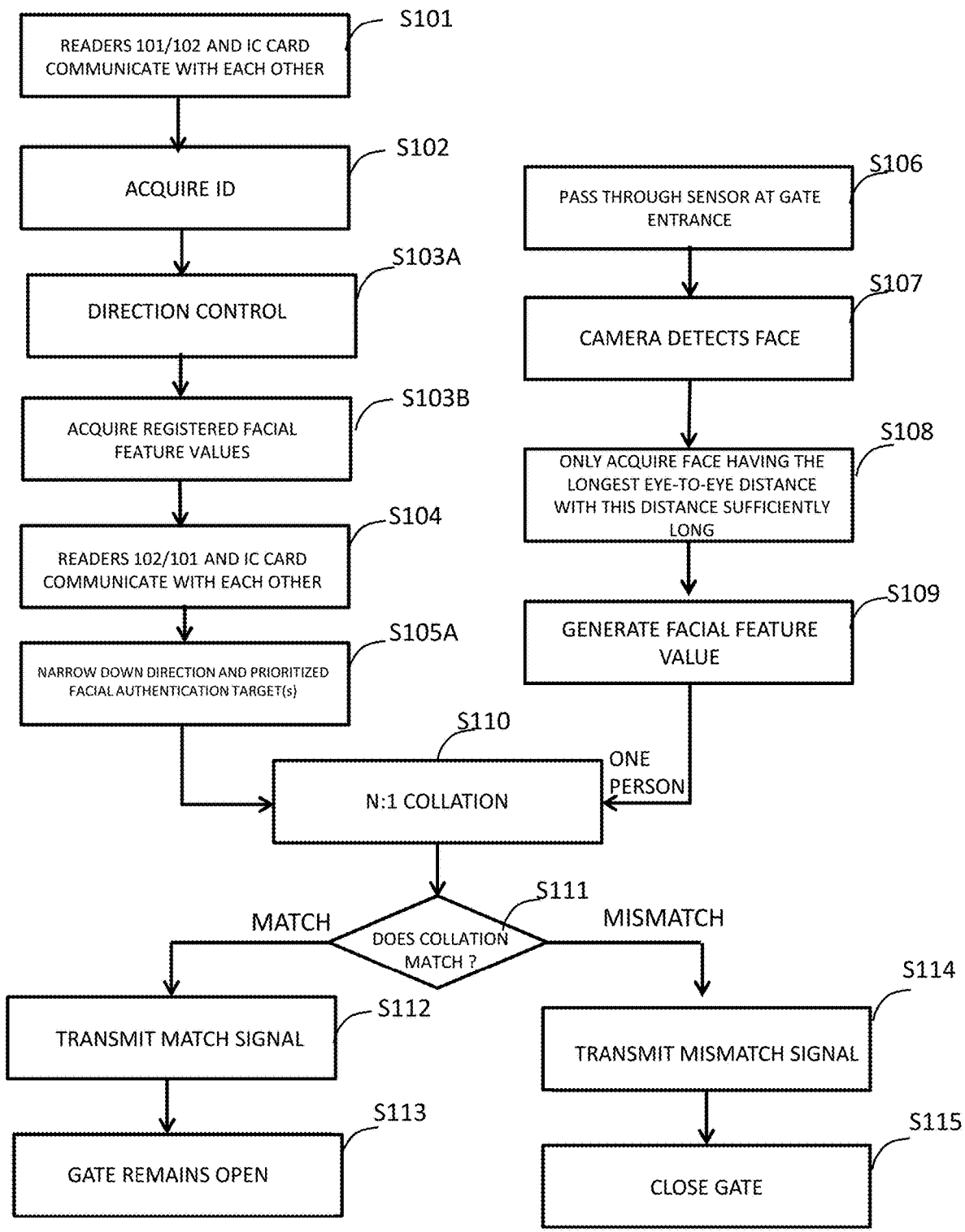
FIG. 13 is a flowchart describing the operation of the second example embodiment of the present invention.

FIG. 13 is a flowchart describing a processing procedure of the second example embodiment of the present invention. The processing procedure in FIG. 13 differs from FIG. 6 in that there is provided a step 103A that controls the direction based on a signal received by the readers and a step 105A that determines which direction, from left to right or from right to left, is prioritized.

As with the variation of the first example embodiment described with reference to FIG. 8, the facial authentication apparatus 110 in FIG. 12 may also be provided outside the gate apparatus 100 in the second example embodiment.

Third Example Embodiment

Figure 14:
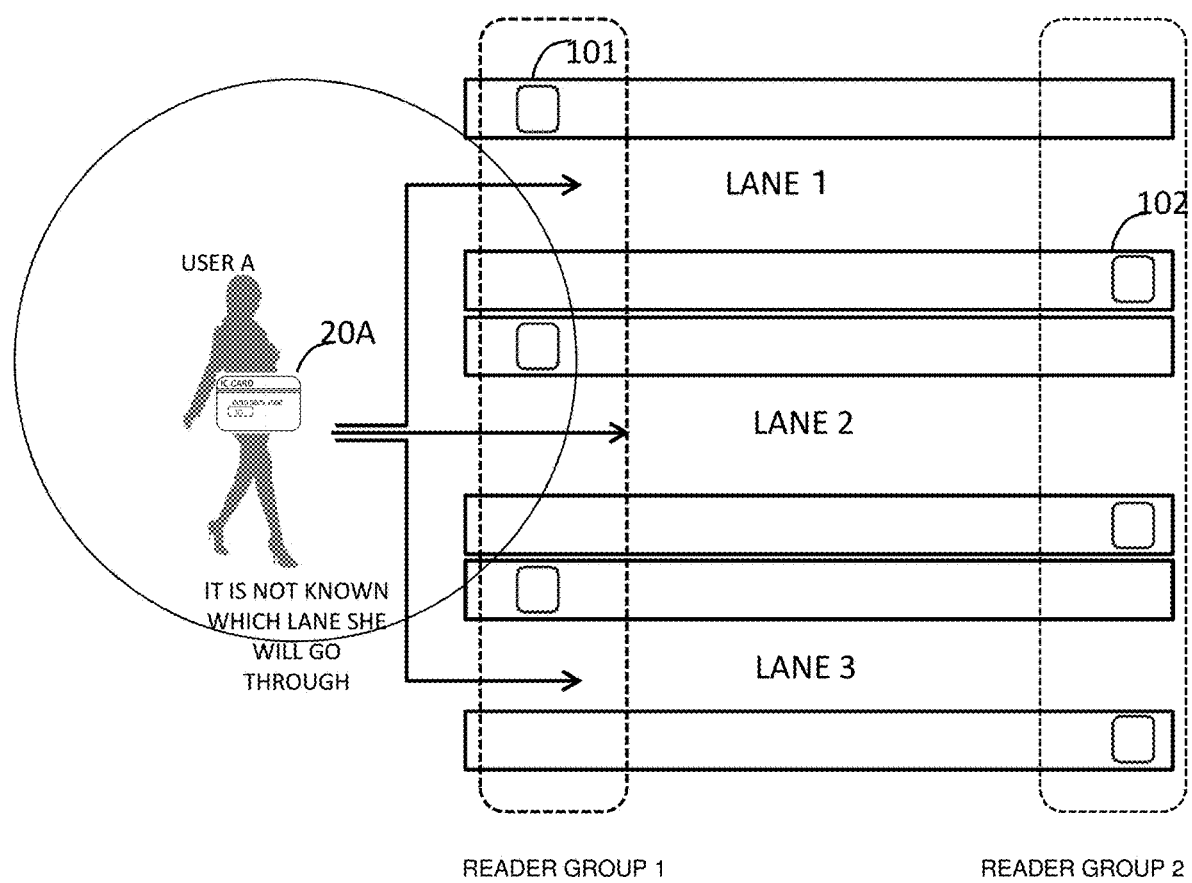
FIG. 14 is a flowchart describing a third example embodiment of the present invention.

FIG. 14 is a diagram illustrating a third example embodiment of the present invention. There are provided a plurality of lanes as illustrated in FIGS. 14 and 3B. It is assumed that a wireless tag ID of a user is received by the reader 101 of lane 2 and a facial feature value corresponding to the wireless tag ID is acquired from the data server 40 in the lane 2, but the user actually goes through lane 3 or lane 1. In this case, the reader 101 in the lane 1 or the lane 3 receives the wireless tag ID and the facial feature value registered in association with this ID is acquired from the data server 40. In the third example embodiment, the storage apparatus 113 is shared by each facial authentication apparatus 110 (the gate apparatus 100) in a plurality of lanes. Therefore, in a case wherein the facial feature value corresponding to the ID is acquired from the data server 40 in the lane 2, but the lane through which the user actually goes is changed to lane 3 or lane 1, it is not necessary to acquire the facial feature value from the data server 40 in the lane 1 or the lane 3. It is noted that in the third example embodiment, a plurality of lanes share a facial feature value corresponding to an wireless tag ID, however, a facial feature value already collated in a predetermined lane is deleted from the storage apparatus 113. Further, the facial authentication apparatus 110 may be provided for each of the plurality of lanes or one common facial authentication apparatus 110 may be provided for the plurality of lanes in the third example embodiment.

Further, as illustrated in FIG. 8, a single external facial authentication apparatus 110 may be provided for a plurality of the gate apparatuses 100 (each has the readers 101 and 102, the camera 103, the image data acquisition part 116, the door 108, and the opening and closing control part 109) corresponding to a plurality of lanes. In a case wherein a single facial authentication apparatus 110 is provided for a plurality of gate apparatuses 100, the gate apparatuses 100 may add a lane number, etc., to IDs received by the readers 101 and 102, a signal detected by the sensor 104, image data captured by the camera 103, etc., and transmits the signal added with the lane number, etc., to the facial authentication apparatus 110 so that the signal source lane can be identified.

Figure 15:
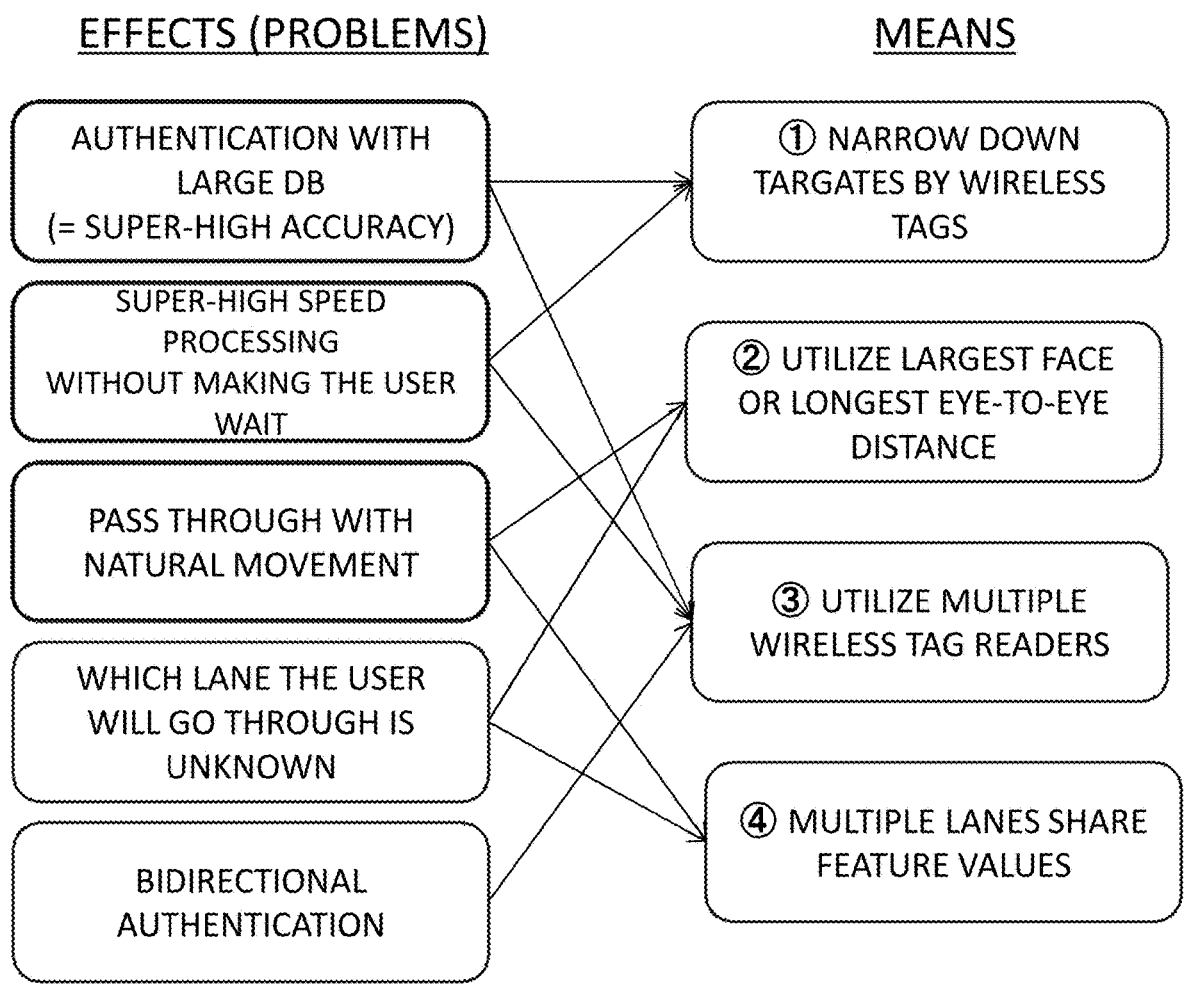
FIG. 15 is a diagram describing effects achieved by the example embodiments of the present invention.

FIG. 15 is a diagram describing how features of the example embodiments correspond to effects (problems solved). By narrowing down targets with wireless tags (for instance reducing the number of users before entering the gate lane) and having the readers read a plurality of the wireless tags, it becomes possible to perform authentication with a database (DB) storing a large amount of facial feature values (resulting in super-high accuracy) and achieve a high throughput without making users wait.

Further, since a face to be authenticated is selected using a face with the largest size or an eye-to-eye distance from image data acquired by a camera, a user is not needed to stop and look at the camera and is able to pass through the gate with natural movement. Further, since facial feature values acquired in association with a wireless tag IDs are shared by a plurality of lanes, the user can pass through the gate with natural movement.

Since a face to be authenticated is selected using a face with the largest size or an eye-to-eye distance (a face having the longest eye-to-eye distance which is sufficiently long is selected) and the facial feature values acquired in association with the wireless tag IDs are shared by a plurality of lanes, facial authentication can also be performed without delay for a user who has suddenly changed from one lane to another.

Further, by providing the first and the second readers spaced apart in the longitudinal direction of the lane, it becomes possible to perform bidirectional authentication.

<Embodiments of the Wireless Tag>

The following describes several embodiments of the wireless tag used in the present invention.

Figure 16A:
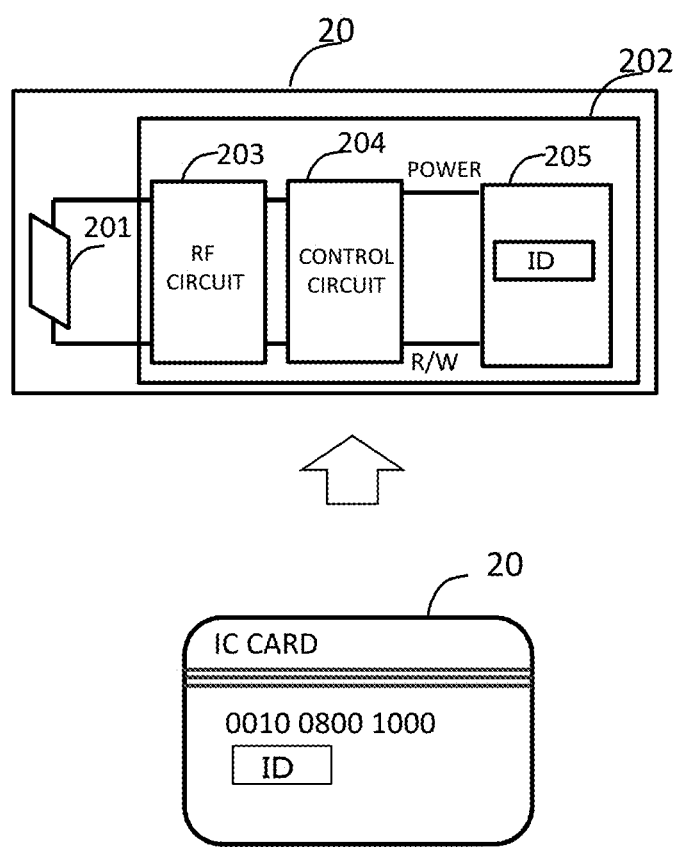
FIG. 16A is a diagram illustrating a first mode of the wireless tag.

FIG. 16A is a diagram illustrating the wireless tag of each example embodiment described above. As illustrated in FIG. 16A, the wireless tag 20 (IC card) includes an IC chip 202 comprising a RF circuit 203, a control circuit 204 and a memory 205 such as a ROM holding an ID of about 64-128 bits, and an antenna 201. The wireless tag 20 is a passive type that receives power from a radio wave from the reader and does not have a battery. The communication distance is 2 to 5 meters. The frequency may be 2.45 MHz (such as ISO-18000-4, etc.). The communication speed may be 20-40 kbps. It is noted that the wireless tag 20 is not limited to the card type shown in FIG. 16A and may be, for instance, bar-shaped. Alternatively, the wireless tag may be penshaped or a wearable type such as a watch or glasses with a built-in RFID tag. Further, it may be a smartphone with a built-in RFID tag.

FIG. 17 is a diagram illustrating an operation sequence of the first example embodiment using the wireless tag of FIG. 16A. The operation sequence of the first example embodiment will be described with reference to FIGS. 17 and 5.

Upon receiving a radio wave from the reader 101, a plurality of the wireless tags 20 in turn reply their IDs (S1). The facial authentication apparatus 110 transmits a search request including the IDs of the wireless tags 20 to the data server 40 (S2).

Figure 16B:
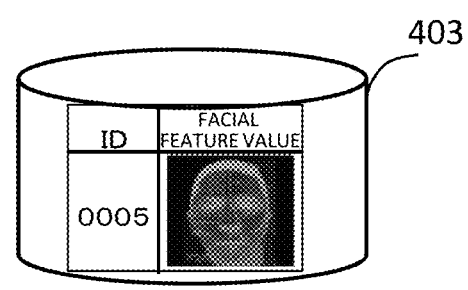
FIG. 16B is a diagram illustrating a database in FIG. 5, etc.

The data server 40 transmits facial feature values corresponding respectively to the received IDs of the wireless tags to the facial authentication apparatus 110 (S3). FIG. 16B is a diagram illustrating the information (an ID and a facial feature value) registered in the storage apparatus (database) 403 of the data server 40. The facial authentication apparatus 110 stores the facial feature values received from the data server 40 in the storage apparatus 113.

When the sensor detects a user entering a lane of the gate, the camera 103 captures an image (S4) and transmits the image to the facial authentication apparatus 110 (S5). It is noted that the image data acquisition part 116 (FIG. 5, etc.) may receive the image data acquired by the camera 103 based on a detection result by the sensor 104 (FIG. 5, etc.).

The camera 103 may acquire a video and transmit the image of a timing specified by the image data acquisition part 116 as a still image to the image data acquisition part 116. The face collation part 119 of the facial authentication apparatus 110 collates the facial feature value extracted from the image data with the facial feature value received from the data server 40 (S6).

The face collation part 119 transmits a collation result to the opening and closing control part 109 (S7). Based on the collation result, the opening and closing control part 109 opens the gate (the door 108) when the facial feature values match and closes it when they do not match (S8).

Fourth Example Embodiment

Figure 18B:
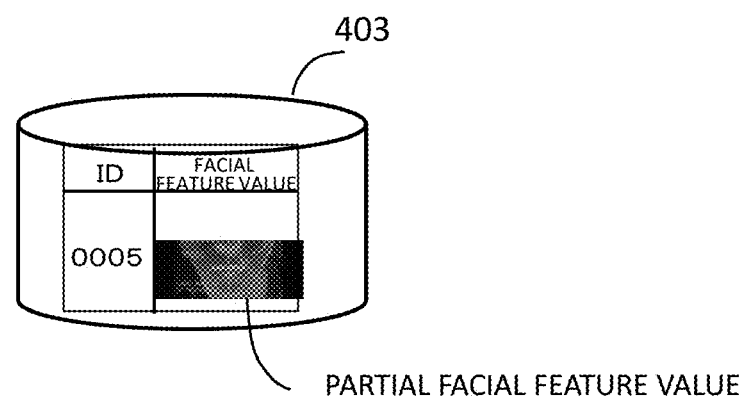
FIG. 18B is a diagram illustrating the database of FIG. 15, etc.

FIG. 18A is a diagram illustrating another embodiment of the wireless tag. The wireless tag 20 stores a part of a facial feature value of a user in the memory 205. The memory 205 is constituted by a rewritable non-volatile memory such as an EEPROM (Electrically Erasable Programmable Read-Only Memory). A part of the facial feature value corresponding to an ID is stored in the data server 40. It is noted that the memory 205 of the wireless tag 20 may be configured to encrypt a part of a facial feature value of a user to store the encrypted data in the memory 205. The data server 40 may encrypt the part of facial feature values corresponding to an ID and transmit the encrypted data to the facial authentication apparatus 110. FIG. 18B is a diagram illustrating information registered in the storage apparatus (database) 403 of the data server 40. The storage apparatus (database) 403 of the data server 40 stores an ID and a corresponding partial facial feature value (a remaining part of the facial feature value that is not stored in the wireless tag 20).

FIG. 19 is a diagram illustrating an operation sequence using the wireless tag of FIG. 18A. Upon receiving a radio wave from the reader 101, a plurality of the wireless tags 20 transmit their IDs and partial facial feature values, respectively (S11).

Upon receiving the IDs and the partial facial feature values from the plurality of wireless tags 20, the facial authentication apparatus 110 transmits a search request including the IDs of the wireless tags 20 to the data server 40 (S12).

The data server 40 transmits a partial facial feature value corresponding to each ID to the facial authentication apparatus 110 as a response to the search request (S13).

A feature value compo siting part 124 of the facial authentication apparatus 110 composites the partial facial feature value corresponding to an ID from the data server 40 and the partial facial feature value of the same ID received from the wireless tag 20 (S14).

When the sensor 104 detects the user entering a lane, the camera 103 captures an image (S15) and sends the image to the facial authentication apparatus 110 (S16). When the partial facial feature value from the wireless tag 20 and the partial facial feature value from the data server 40 are encrypted, the facial authentication apparatus 110 decrypts the partial facial feature value from the wireless tag 20 and the partial facial feature value from the data server 40.

The facial authentication apparatus 110 composites the partial facial feature value transmitted from the wireless tag 20 and the partial facial feature value from the data server 40, and collates the facial feature value extracted from the image data with the composited feature value (S17).

The face collation part 119 sends a collation result (authentication result) to the opening and closing control part 109 (S18). Based on the collation result, the opening and closing control part 109 sets the gate (the door 108) to an open state when the facial feature values match and closes the gate to a closed state when they do not match (S19).

FIG. 20 is a diagram illustrating an apparatus configuration of a fourth example embodiment corresponding to the wireless tag of FIG. 18A. The fourth example embodiment in FIG. 20 differs from the first example embodiment in FIG. 5 in that a partial feature value 1 reception part 121, a partial feature value 2 acquisition part 123, and the feature value compositing part 124 are provided. The partial feature value 1 reception part 121 acquires a partial facial feature value transmitted along with an ID from a wireless tag.

The partial feature value 2 acquisition part 123 acquires a partial facial feature value corresponding to an ID transmitted from the data server 40.

The feature value compositing part 124 composites the partial facial feature values 1 and 2 received by the partial feature value 1 reception part 121 and the partial feature value 2 acquisition part 123.

The face collation part 119 collates the facial feature value obtained by compositing the partial facial feature values transmitted from the wireless tag 20 and the partial facial feature values from the data server 40 with a facial feature value extracted from image data.

The face collation part 119 transmits a collation result to the opening and closing control part 109. The opening and closing control part 109 keeps the door 108 open when the facial feature values match and sets the door 108 in a closed state when they do not.

As described, the feature value compo siting part 124 composites a facial feature value based on the partial facial feature value received from the wireless tag and the partial feature value received from the data server 40 in the fourth example embodiment. If an ID is not received in advance from the wireless tag, unlike the fourth example embodiment, it may not be possible to capture an image and perform collation for facial authentication, simultaneously depending on a processing time required to composite partial facial feature values, resulting in deterioration of throughput.

On the other hand, in the fourth example embodiment, by acquiring in advance from the data server 40 a partial facial feature value corresponding to an ID received from the wireless tag, it becomes possible to composite a facial feature value based on the partial facial feature value and the partial facial feature value received from the wireless tag before the camera 103 captures an image of the user, thereby avoiding the deterioration of throughput.

As with the variation of the first example embodiment described with reference to FIG. 8, the facial authentication apparatus 110 in FIG. 20 may also be provided outside the gate apparatus 100 in the present example embodiment.

Fifth Example Embodiment

FIG. 21 is a diagram illustrating another mode of the wireless tag. The wireless tag 20 stores an entire facial feature value of a user in the memory 205. The memory 205 may be constituted by a rewritable non-volatile memory such as an EEPROM. Further, the memory 205 of the wireless tag 20 may be configured to encrypt the facial feature value of the user to store the encrypted data in the memory 205.

Figure 22:
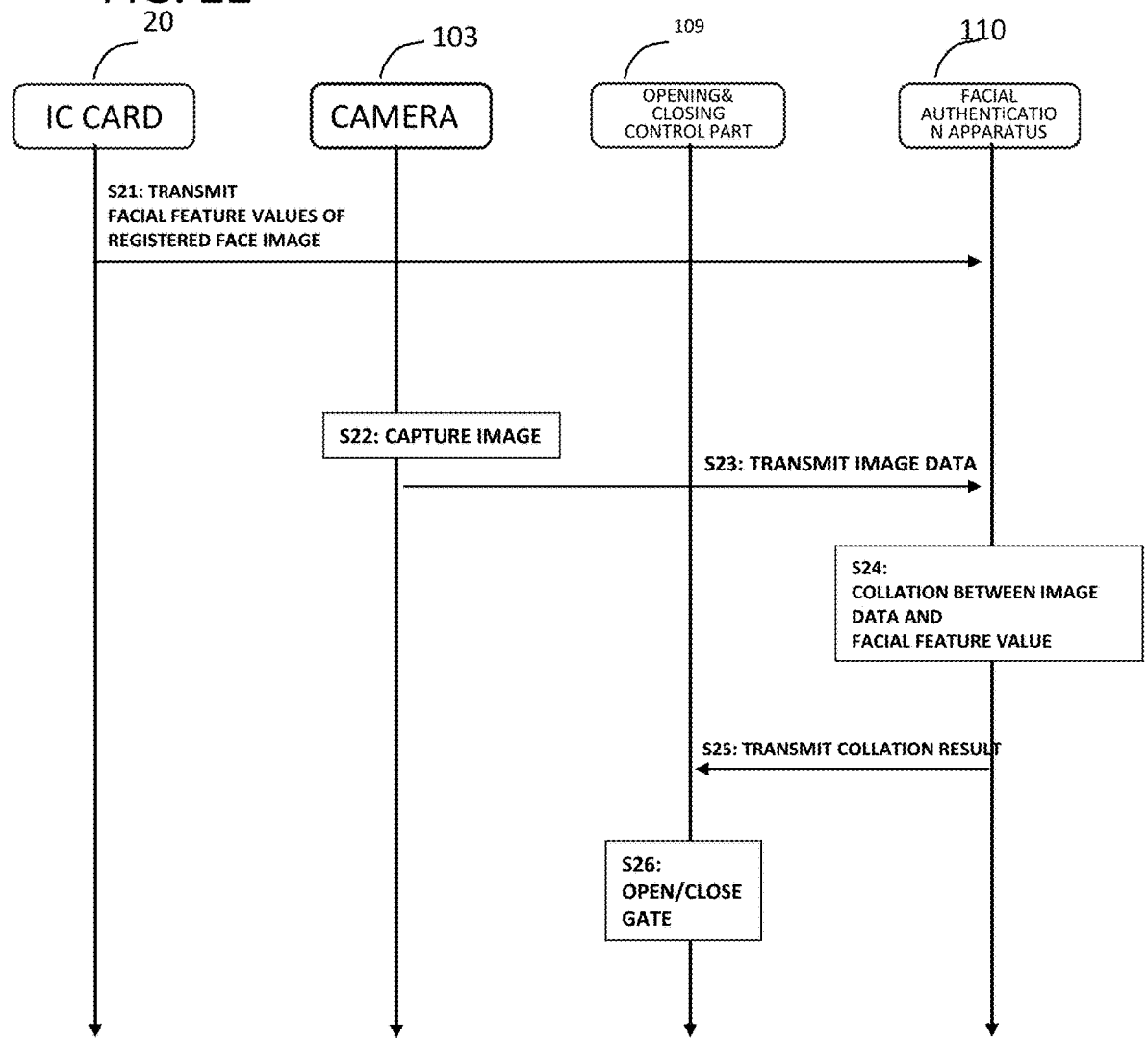
FIG. 22 is a diagram illustrating an operation sequence of the third mode of the wireless tag.

FIG. 22 is a diagram illustrating an operation sequence when the wireless tag in FIG. 21 is used. Upon receiving a radio wave from the reader 101, a plurality of the wireless tags 20 reply IDs and facial feature values, respectively (S21). When the facial feature value from the wireless tag 20 are stored encrypted, the facial authentication apparatus 110 decrypts the facial feature value transmitted from the wireless tag 20.

The camera 103 captures an image (S22) and sends the image to the facial authentication apparatus 110 (S23).

The face collation part 119 of the facial authentication apparatus 110 collates the facial feature value transmitted from the wireless tag 20 with a facial feature value extracted from the image data (S24).

The face collation part 119 transmits a collation result (authentication result) to the opening and closing control part 109 (S25). Based on the collation result, the opening and closing control part 109 set the gate (the door 108) in an open state when the facial feature values match and set the gate (the door 108) in a closed state when they do not match (S26).

Figure 23:
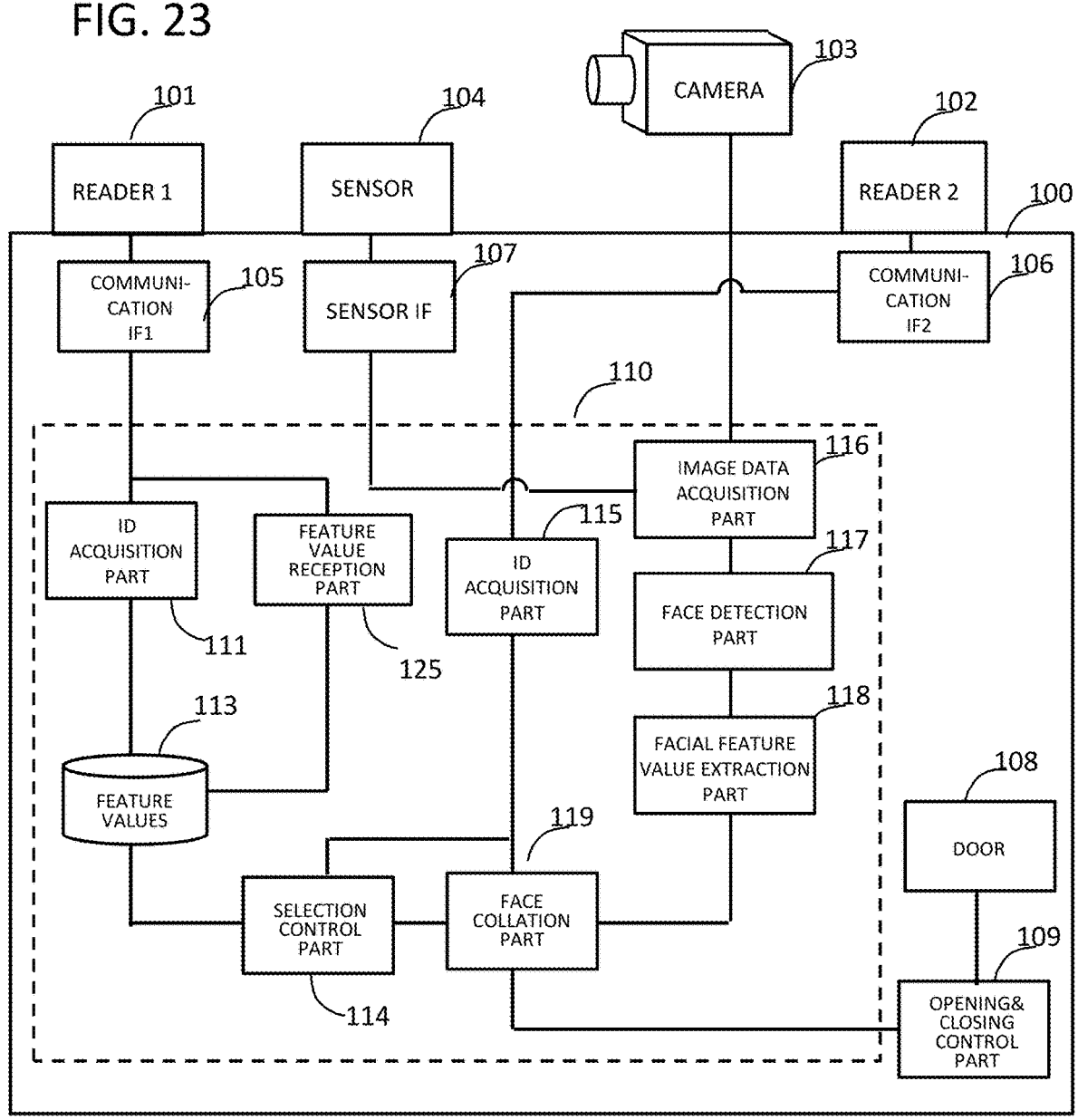
FIG. 23 is a diagram illustrating the configuration of a fifth example embodiment of the present invention (corresponding to the third mode of the wireless tag).

FIG. 23 is a diagram illustrating an apparatus configuration of the fifth example embodiment corresponding to the wireless tag of FIG. 21. The fifth example embodiment as illustrated in FIG. 23 differs from the example embodiment in FIG. 5 in that a feature value reception part 125 is provided and the feature value acquisition part 112 is omitted. The feature value reception part 125 acquires a facial feature value transmitted from the wireless tag and stores the received facial feature value in the storage apparatus 113. The facial authentication apparatus 110 collates the facial feature value transmitted from the wireless tag 20 with a facial feature value extracted from image data.

As with the variation of the first example embodiment described with reference to FIG. 8, the facial authentication apparatus 110 in FIG. 23 may also be provided outside the gate apparatus 100 in the present example embodiment.

When the example embodiments described above are used as automatic ticket gates at train stations, it becomes possible to exclude those that are not possible in terms of relation between time and location with regards to boarding and disembarking stations and detect fraud, etc. For instance, when a plurality of search requests including the same identifier transmitted from the feature value acquisition parts 112 of different gate apparatuses 100 are issued to the data server 40 simultaneously or within a predetermined period of time from different regions, the control part 402 of the data server 40 in FIG. 5 detects fraudulent use of the wireless tag.

Sixth Example Embodiment

Figure 24:
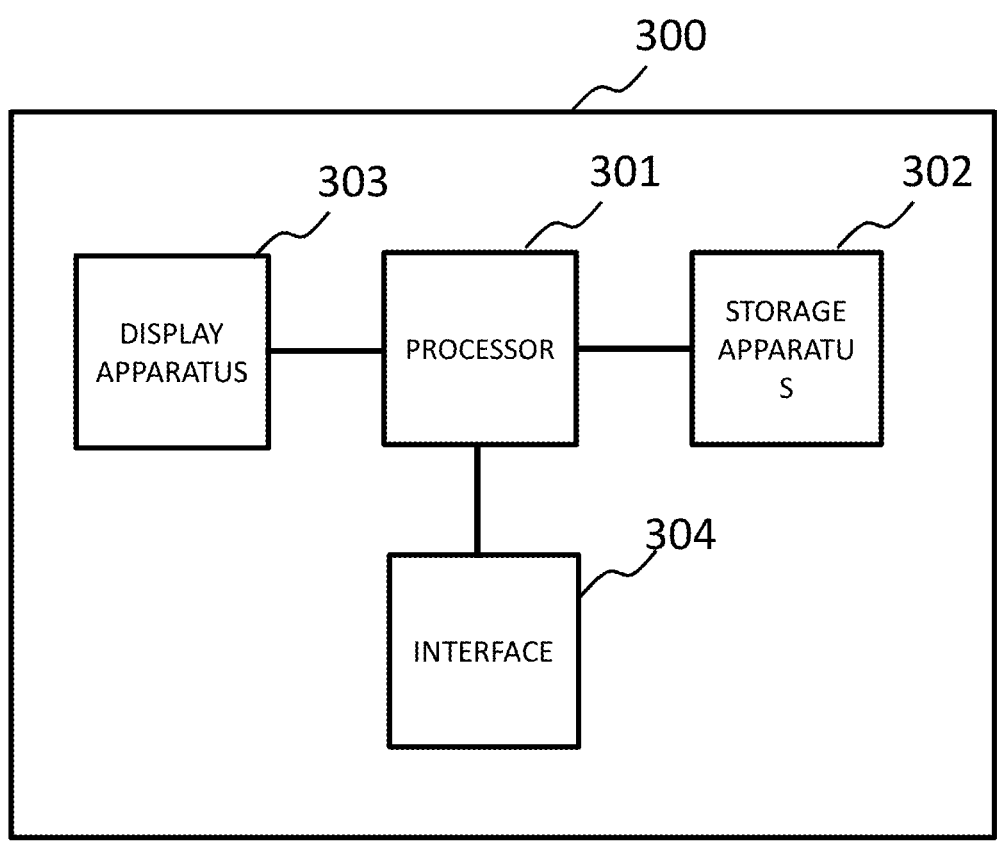
FIG. 24 is a diagram illustrating the configuration of a sixth example embodiment of the present invention.

FIG. 24 is a diagram illustrating a configuration in which the facial authentication apparatus of the example embodiments described above is implemented as a computer 300. The computer 300 includes a processor 301, a storage apparatus 302, a display apparatus 303, and an interface 304. The processor 301 is able to execute control performed in the facial authentication apparatus of each of the example embodiments, by executing a program stored in the storage apparatus 302. The display apparatus 303 may display "○" or "x" notifying opening and closing of the gate and a direction. The interface 304 may be configured to comprise communication interfaces that connect to the readers 1 and 2, the camera, the sensor, and the data server 40 via the network.

Further, the disclosure of each Patent Literature cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual examples and the individual elements of the individual figures) within the scope of the Claims of the present invention. That is, it is self-explanatory that the present invention includes any types of variations and modifications to be done by a skilled person according to the whole disclosure including the Claims, and the technical concept of the present invention.

For instance, methods and programs of the example embodiments above can be described as the following supplementary notes (but not limited thereto).

(Supplementary Note 1)

A facial authentication method comprising steps of:

upon reception, by a reader part, of one or more identifiers transmitted by one or more wireless tags of one or more users not yet entering into a gate, acquiring individual one or more facial feature values registered in association with the individual one or more identifiers;

extracting a facial feature value from an image in which the user is imaged; and collating the extracted feature value with the one or more facial feature values acquired to check whether or not there is a match.

(Supplementary Note 2)

The facial authentication method according to Supplementary Note 1, comprising:

sending a search request including an identifier of a wireless tag received by the reader part to a data server before photographing the user entering the gate, wherein the data server stores in advance a facial feature value of the user in association with an identifier stored in a wireless tag of the user; and acquiring the facial feature value corresponding to the identifier from the data server.

(Supplementary Note 3)
The facial authentication method according to Supplementary Note 1 or 2, comprising
including opening or closing an exit of the gate according to a result of the collation.
(Supplementary Note 4)
The facial authentication method according to Supplementary Note 3, comprising
opening the gate exit when the extracted facial feature value matches any one of the acquired facial feature values, and
closing the gate exit when there is no match.
(Supplementary Note 5)
The facial authentication method according to any one of Supplementary Notes 1 to 4, wherein the reader part includes:
a first reader provided at a first side of a longitudinal direction of the gate that receives one or more identifiers transmitted from the one or more wireless tags of one or more users entering a wireless area located outside an end of the first side of the longitudinal direction of the gate; and
a second reader provided at a second side of the longitudinal direction of the gate, and wherein the method comprises
collating the extracted facial feature value with one or more facial feature values acquired to check if there is a match when the second reader receives the identifier from the wireless tag after the first reader.
(Supplementary Note 6)
The facial authentication method according to Supplementary Note 5, wherein the second reader is also able to receive one or more identifiers from one or more wireless tags of one or more users entering a wireless area located outside a second end of the longitudinal direction of the gate, wherein
the first reader is also able to receive an identifier from a wireless tag of a user who moves from the second end side of the longitudinal direction of the gate to the first end side of the longitudinal direction of the gate, and wherein the method comprises
determining whether the moving direction of the user is from the first end of the longitudinal direction of the gate to the second end or vice versa, based on which reader receives an identifier first when both the first and the second readers receive the identifier from the same wireless tag.
(Supplementary Note 7)
The facial authentication method according to Supplementary Note 5 or 6, comprising
using in common the facial feature value acquired by the acquisition part in association with an identifier received by each of a plurality of the first readers or a plurality of the second readers provided corresponding to each of a plurality of lanes of the gate in collation with the facial feature value extracted in each of the plurality of lanes of the gate.
(Supplementary Note 8)
The facial authentication method according to any one of Supplementary Notes 1 to 7, comprising:
detecting a face from the image data captured; and
performing collation with the facial feature values acquired by the acquisition part from the user in a first front line out of the detected faces.
(Supplementary Note 9)
The facial authentication method according to any one of Supplementary Notes 1 to 8, comprising
selecting the acquired facial feature value based on an order in which the identifier is received from the wireless tags or an order according to a moving direction of the user; and
collating the selected facial feature value with the extracted facial feature value.
(Supplementary Note 10)
The facial authentication method according to any one of Supplementary Notes 1 to 8, comprising
determining an order in which the facial feature values are collated with the extracted facial feature value based on an order in which the facial feature values are acquired.
(Supplementary Note 11)
The facial authentication method according to any one of Supplementary Notes 1 to 8, comprising
prioritizing, regarding the acquired facial feature value, a facial feature value corresponding to an identifier of the wireless tag received by both the first and the second readers over a facial feature value corresponding to an identifier of the wireless tag received by one of the first and the second readers, and
collating the prioritized facial feature value with the extracted facial feature value.
(Supplementary Note 12)
The facial authentication method according to any one of Supplementary Notes 1 to 11, comprising
the imaging part performing image capturing upon detection pf the user by a sensor that monitors movement of the user in a lane inside the gate.
(Supplementary Note 13)
The facial authentication method according to any one of Supplementary Notes 5 to 7, comprising
the imaging part performing image capturing when one of the first and the second readers receives an identifier of the wireless tag and the other one of the first and the second readers receives the identifier of the wireless tag.
(Supplementary Note 14)
The facial authentication method according to any one of Supplementary Notes 1 to 13, comprising
deleting the facial feature value that matches in the collation out of the acquired facial feature values.
(Supplementary Note 15)
The facial authentication method according to Supplementary Note 2, comprising:
having the wireless tag store and hold a part of a facial feature value of a user along with the identifier;
registering a remaining part of the facial feature value of the user in the data server;
receiving the identifier of the wireless tag and the part of the facial feature values from the wireless tag;
acquiring the remaining part of the facial feature value registered in association with the identifier from the data server;
compositing the part of the facial feature value received from the wireless tag and the acquired remaining part of the facial feature value; and
collating the extracted facial feature value with the composited facial feature value.
(Supplementary Note 16)
The facial authentication method according to Supplementary Note 1 comprising:
having the wireless tag store and hold a facial feature value of a user along with the identifier;
receiving the identifier of the wireless tag and the facial feature value from the wireless tag; and
collating the extracted facial feature value with the facial feature value received from each wireless tag.

(Supplementary Note 17)
The facial authentication method according to Supplementary Note 2, comprising
the data server detecting fraud when a plurality of search requests including the same identifier received from the wireless tags are issued to the data server, simultaneously or within a predetermined period of time, from a plurality of different regions.

(Supplementary Note 18)
A program causing a computer to execute processing comprising:
upon reception, by a reader part, of one or more identifiers transmitted by one or more wireless tags of one or more users not yet entering into a gate, acquiring individual one or more facial feature values registered in association with the individual one or more identifiers;
extracting a facial feature value from an image in which the user is imaged; and
collating the extracted feature value with the one or more facial feature values acquired to check whether or not there is a match.

(Supplementary Note 19)
The program according to Supplementary Note 18, causing the computer to execute:
sending a search request including an identifier of a wireless tag received by the reader part to a data server before photographing the user entering the gate, wherein the data server stores in advance a facial feature value of the user in association with an identifier stored in a wireless tag of the user; and
acquiring the facial feature value corresponding to the identifier from the data server.

(Supplementary Note 20)
The program according to Supplementary Note 18 or 19,
causing the computer to execute:
opening or closing an exit of the gate according to a result of the collation.

(Supplementary Note 21)
The program according to Supplementary Note 20, causing the computer to execute:
opening the gate exit when the extracted facial feature value matches any one of one or more sets of the acquired facial feature values; and
closing the gate exit when there is no match.

(Supplementary Note 22)
The program according to any one of Supplementary Notes 18 to 21, wherein the reader part includes:
a first reader provided at a first side of a longitudinal direction of the gate that receives one or more identifiers transmitted from the one or more wireless tags of one or more users entering a wireless area located outside an end of the first side of the longitudinal direction of the gate; and
a second reader provided at a second side of the longitudinal direction of the gate, and wherein the program causes the computer to execute:
collating the extracted facial feature value with one or more facial feature values acquired to check if there is a match when the second reader receives the identifier from the wireless tag after the first reader.

(Supplementary Note 23)
The program according to Supplementary Note 22, wherein the second reader is also able to receive one or more identifiers from one or more wireless tags of one or more users entering a wireless area located outside a second end of the longitudinal direction of the gate, wherein
the first reader is also able to receive an identifier from a wireless tag of a user who moves from the second end side of the longitudinal direction of the gate to the first end side of the longitudinal direction of the gate, and wherein the program causes the computer to execute:
determining whether the moving direction of the user is from the first end of the longitudinal direction of the gate to the second end or vice versa, based on which reader receives an identifier first when both the first and the second readers receive the identifier from the same wireless tag.

(Supplementary Note 24)
The program according to Supplementary Note 22 or 23, causing the computer to execute:
using in common the facial feature value acquired by the acquisition part in association with an identifier received by each of a plurality of the first readers or a plurality of the second readers provided corresponding to each of a plurality of lanes of the gate in collation with the facial feature value extracted in each of the plurality of lanes of the gate.

(Supplementary Note 25)
The program according to any one of Supplementary Notes 18 to 24, causing the computer to execute:
detecting a face from the image data captured; and
performing collation with the facial feature values acquired by the acquisition part from the first user in a line out of the detected faces.

(Supplementary Note 26)
The program according to any one of Supplementary Notes 18 to 25 causing the computer to execute:
selecting the acquired facial feature value based on an order in which the identifier is received from the wireless tags or an order according to a moving direction of the user; and
collating the selected facial feature value with the extracted facial feature value.

(Supplementary Note 27)
The program according to any one of Supplementary Notes 18 to 25, causing the computer to execute:
determining an order in which the facial feature values are collated with the extracted facial feature value based on an order in which the facial feature values are acquired.

(Supplementary Note 28)
The program according to any one of Supplementary Notes 18 to 25, causing the computer to execute:
prioritizing, regarding the acquired facial feature value, a facial feature value corresponding to an identifier of the wireless tag received by both the first and the second readers over a facial feature value corresponding to an identifier of the wireless tag received by one of the first and the second readers, and
collating the prioritized facial feature value with the extracted facial feature value.

(Supplementary Note 29)
The program according to any one of Supplementary Notes 18 to 28, causing the computer to execute:
the imaging part performing image capturing upon detection pf the user by a sensor that monitors movement of the user in a lane inside the gate.

(Supplementary Note 30)
The program according to any one of Supplementary Notes 22 to 24, causing the computer to execute:
the imaging part performing image capturing when one of the first and the second readers receives an identifier of the wireless tag and the other one of the first and the second readers receives the identifier of the wireless tag.

(Supplementary Note 31)
The program according to any one of Supplementary Notes 18 to 30 causing the computer to execute:
deleting the facial feature value that matches in the collation out of the acquired facial feature values.
(Supplementary Note 32)
The program according to Supplementary Note 19, wherein the wireless tag stores and holds a part of a facial feature value of a user along with the identifier,
wherein a remaining part of the facial feature value of the user is registered in the data server, and wherein the program causes the computer to execute:
receiving the identifier of the wireless tag and the part of the facial feature values from the wireless tag;
acquiring the remaining part of the facial feature value registered in association with the identifier from the data server;
compositing the part of the facial feature value received from the wireless tag and the acquired remaining part of the facial feature value; and
collating the extracted facial feature value with the composited facial feature value.
(Supplementary Note 33)
The program according to Supplementary Note 18, wherein the wireless tag stores and holds a facial feature value of a user along with the identifier, wherein the program causes the computer to execute:
receiving the identifier of the wireless tag and the facial feature value from the wireless tag; and
collating the extracted facial feature value with the facial feature value received from each wireless tag.
(Supplementary Note 34)
A non-transitory computer-readable recording medium storing therein a program causing a computer to execute:
upon reception, by a reader part, of one or more identifiers transmitted by one or more wireless tags of one or more users not yet entering into a gate, acquiring individual one or more facial feature values registered in association with the individual one or more identifiers;
extracting a facial feature value from an image in which the user is imaged; and
collating the extracted feature value with the one or more facial feature values acquired to check whether or not there is a match.

What is claimed is:

1. A gate apparatus comprising:
a processor;
a memory coupled with the processor and storing a program executable by the processor;
a plurality of readers provided corresponding to a plurality of lanes of a gate, each reader configured to receive one or more identifiers transmitted by one or more wireless tags of one or more users entering a wireless area located outside one end of a longitudinal direction of the plurality of lanes of the gate;
a camera that captures image of the user,
wherein the processor, based on the program stored in the memory, is configured to execute:
an acquisition process that acquires one or more individual facial feature values registered in association with the one or more identifiers received from the one or more wireless tags;
an extraction process that extracts a facial feature value from image data captured by the camera; and
a face collation process that receives the facial feature value extracted by the extraction process and performs collation to check whether or not the feature value extracted matches any one of one or more facial feature values acquired by the acquisition process,
wherein the one or more identifiers comprises a first identifier, the plurality of readers comprises a first reader configured to read the first identifier and the plurality of lanes of the gate comprises a first lane including the first reader, and
wherein the face collation process is performed by sharing the facial feature value acquired in association with the first identifier at the first lane with other lanes, among the plurality of lanes of the gate.

2. The gate apparatus according to claim 1, wherein the acquisition process acquires the facial feature value corresponding to the identifier received by the reader from the wireless tag before the camera captures the image of the user entering the gate.

3. The gate apparatus according to claim 1, wherein the processor is configured to execute:
an opening and closing control process that sets a gate exit in an open state or a closed state according to a result of collation by the face collation process.

4. The gate apparatus according to claim 3, wherein the opening and closing control process sets the gate exit in an open state when the result of collation by the face collation process indicates that the facial feature value extracted by the extraction process matches any one of the one or more facial feature values acquired by the acquisition process, and closes the gate exit in a closed state in a closed state when there is no match.

5. The gate apparatus according to claim 1, wherein the each reader in each lane of the gate includes:
the first reader that is arranged at one side along the longitudinal direction of the each lane of the gate and that receives the first identifier transmitted from each of the one or more wireless tags of the one or more users entering the wireless area; and
a second reader provided at other side along the longitudinal direction of the lane of the gate and configured to receive the first identifier transmitted from the each of the one or more wireless tags of the one or more users and already received by the first reader, and wherein
the face collation process collates the facial feature value extracted by the extraction process with the one or more facial feature values acquired by the acquisition process, when the second reader, following the first reader, receives the first identifier from the wireless tag.

6. The gate apparatus according to claim 5,
wherein the second reader also is configured to be able to receive one or more second identifiers from one or more second wireless tags of one or more second users entering a second wireless area located outside a second end of the longitudinal direction of the gate, the second end being opposite to the one end,
the first reader being also configured to be able to receive an identifier from the wireless tag of the second user who moves from the second end side of the longitudinal direction of the gate to the one end side of the longitudinal direction of the gate, wherein the processor is configured to execute:
a direction control process that determines whether a moving direction of a user having the wireless tag from which both the first and the second readers receive an identifier is from the one end of the longitudinal direction of the gate to the second end or from the second end to the one end, based on which reader out of the first reader and the second reader received the identifier first.

7. The gate apparatus according to claim 6, wherein the face collation process collates the facial feature value extracted by the extraction process with the one or more facial feature values acquired by the acquisition process, when the second reader, following the first reader, receives the identifier from the wireless tag.

8. The gate apparatus according to claim 5, wherein the processor is configured to execute:
a selection control process that, regarding the facial feature values acquired by the acquisition process, prioritizes facial feature value corresponding to an identifier received from the same wireless tag by both the first and the second readers over a facial feature value corresponding to an identifier received from the wireless tag by one of the first and the second readers, and that provides the prioritized facial feature values to the face collation process.

9. The gate apparatus according to claim 5, wherein the camera performs image capturing, when one of the first and the second readers receives the identifier of the wireless tag and the other one of the first and the second readers receives the identifier of the wireless tag.

10. The gate apparatus according to claim 1, wherein the processor is configured to execute:
a face detection process that detects a face from image data captured by the camera, wherein
the face collation process performs collation with the facial feature value acquired by the acquisition process, from the user who is in a first front row and identified based on a size and eye-to-eye distance of the face, out of faces detected by the face detection process.

11. The gate apparatus according to claim 1, wherein the processor is configured to execute:
a selection control process that selects the facial feature value from among the facial feature values acquired by the acquisition process based on an order in which identifiers are received from the wireless tags or an order according to a moving direction of the user and provides the selected facial feature values to the face collation process.

12. The gate apparatus according to claim 1, wherein the processor is configured to execute:
a selection control process that determines an order in which the facial feature value acquired by the acquisition process is provided to the face collation process, based on an order in which the acquisition process acquires facial feature values.

13. The gate apparatus according to claim 1, comprising
a sensor that monitors progress of the user in a lane inside the gate, wherein the camera captures image of the user, when the sensor detects the user.

14. The facial authentication system comprising the gate apparatus according to claim 1.

15. The facial authentication system according to claim 14, comprising
a data server that stores in advance the facial feature value of the user in association with the identifier stored in the wireless tag of the user,
wherein the processor in the gate apparatus transmits a search request including the identifier of the wireless tag received by the reader in the gate apparatus to the data server before the image of the user entering the gate is captured, and acquires a facial feature value corresponding to the identifier from the data server.

16. The facial authentication system according to claim 15, wherein the wireless tag stores and holds the identifier and a part of facial feature value of the user,
a remaining part of the facial feature value of the user is registered in the data server,
the reader in the gate apparatus receives the identifier of the wireless tag and the part of the facial feature values from the wireless tag, and
the acquisition process in the gate apparatus acquires the remaining part of the facial feature value registered in association with the identifier from the data server, wherein the processor in the gate apparatus is configured to execute:
a compositing process that composites the part of the facial feature value received by the reader part from the wireless tag and the remaining part of the facial feature value acquired by the acquisition part, wherein
the face collation process collates the facial feature value extracted by the extraction part with the facial feature values composited by the compositing process.

17. The facial authentication system according to claim 15, wherein the data server includes a processor that detects fraud when a plurality of search requests including the same identifier received from the wireless tags are issued to the data server simultaneously or within a predetermined period of time, from a plurality of different regions.

18. The facial authentication system according to claim 14, wherein the wireless tag stores and holds the identifier and the facial feature value of the user,
the reader in the gate apparatus receives the identifier of the wireless tag and the facial feature value from the wireless tag, and wherein
the face collation process in the gate apparatus collates the facial feature value extracted by the extraction part with the facial feature value received by the reader from each wireless tag.

19. A facial authentication method by a gate apparatus that includes a plurality of readers provided corresponding to a plurality of lanes of a gate, the method comprising:
upon reception, by the reader, of one or more identifiers transmitted by one or more wireless tags of one or more users not yet entering into the lave of the gate,
acquiring individual one or more facial feature values registered in association with the individual one or more identifiers;
extracting a facial feature value from an image in which the user is imaged; and
collating the extracted feature value with the one or more facial feature values acquired to check whether or not there is a match,
wherein the one or more identifiers comprises a first identifier, the plurality of readers comprises a first reader configured to read the first identifier and the plurality of lanes of the gate comprises a first lane including the first reader, and
wherein the collating is performed by sharing the facial feature value acquired in association with the first identifier at the first lane with other lanes, among the plurality of lanes of the gate.

20. A non-transitory computer-readable recording medium storing therein a program causing a computer of a gate apparatus that includes the computer and a plurality of readers provided corresponding to a plurality of lanes of a gate to execute processing comprising:
upon reception, by the reader, of one or more identifiers transmitted by one or more wireless tags of one or more users not yet entering into a lane, among the plurality of lanes of the gate, acquiring individual one or more facial feature values registered in association with the individual one or more identifiers;

extracting a facial feature value from an image in which the user is imaged; and collating the extracted feature value with the one or more facial feature values acquired to check whether or not there is a match, wherein the one or more identifiers comprises a first identifier, the plurality of readers comprises a first reader configured to read the first identifier and the plurality of lanes of the gate comprises a first lane including the first reader, and wherein the collating is performed by sharing the facial feature value acquired in association with the first identifier at the first lane with other lanes, among the plurality of lanes of the gate.

* * * * *